(12) United States Patent
Inoue et al.

(10) Patent No.: US 9,733,098 B2
(45) Date of Patent: Aug. 15, 2017

(54) VEHICLE INFORMATION PROVIDING DEVICE

(71) Applicant: Nissan Motor Co., Ltd., Yokohama-shi, Kanagawa (JP)

(72) Inventors: Hirofumi Inoue, Yamato (JP); Daisuke Saito, Ebina (JP); Toshiro Muramatsu, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/653,914

(22) PCT Filed: May 31, 2013

(86) PCT No.: PCT/JP2013/065167
§ 371 (c)(1),
(2) Date: Jun. 19, 2015

(87) PCT Pub. No.: WO2014/103401
PCT Pub. Date: Jul. 3, 2014

(65) Prior Publication Data
US 2015/0316389 A1  Nov. 5, 2015

(30) Foreign Application Priority Data
Dec. 27, 2012  (JP) ................................ 2012-284275

(51) Int. Cl.
*G01C 21/36* (2006.01)
*G01C 21/34* (2006.01)
*B60L 11/18* (2006.01)

(52) U.S. Cl.
CPC ...... *G01C 21/3469* (2013.01); *B60L 11/1838* (2013.01); *G01C 21/3461* (2013.01);
(Continued)

(58) Field of Classification Search
USPC .......................................................... 701/521
See application file for complete search history.

(56) References Cited

U.S. PATENT DOCUMENTS 5,815,824 A * 9/1998 Saga ........................ B60K 6/46
                                                  180/65.245
8,972,161 B1 * 3/2015 Koebler ............. G01C 21/3469
                                                  340/995.27
(Continued)

FOREIGN PATENT DOCUMENTS

JP        2005-98749 A      4/2005
JP        2010-78563 A      4/2010
(Continued)

*Primary Examiner* — Jean-Paul Cass
(74) *Attorney, Agent, or Firm* — Global IP Counselors, LLP

(57) ABSTRACT

A vehicle information providing device provides route information to vehicles. The vehicle information providing device has a history information accumulation unit that sequentially acquires at least one of driving location information, power consumption information and charging location information from vehicle-mounted devices of a plurality of vehicle, and stores as driving history information. A presentation route is determined by extracting the stored driving history information. The stored driving history information is referenced to determine a route travelled from the departure-point range to the target-point range, from among the routes travelled by the vehicle as the presentation route. Also, the vehicle information providing device alters the search conditions and the search is performed again, when there are no routes traveling from the departure location range to the destination range within a predetermined range.

9 Claims, 18 Drawing Sheets

(52) U.S. Cl.
CPC ......... *G01C 21/3484* (2013.01); *G01C 21/36* (2013.01); *B60L 2240/622* (2013.01); *B60L 2240/70* (2013.01); *B60L 2240/72* (2013.01); *B60L 2250/12* (2013.01); *B60L 2250/16* (2013.01); *B60L 2260/52* (2013.01); *B60L 2260/54* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01)

(56) References Cited

U.S. PATENT DOCUMENTS

| | | | | |
|---|---|---|---|---|
| 9,412,278 | B1* | 8/2016 | Gong | H04L 63/101 |
| 2007/0112475 | A1* | 5/2007 | Koebler | B60L 3/12 701/1 |
| 2009/0040033 | A1* | 2/2009 | Uchida | B60K 6/365 340/439 |
| 2009/0146846 | A1* | 6/2009 | Grossman | B60R 25/04 340/988 |
| 2011/0161143 | A1* | 6/2011 | Tajima | G01R 22/10 705/14.1 |
| 2011/0166774 | A1* | 7/2011 | Schunder | G01C 21/3469 701/533 |
| 2011/0264366 | A1* | 10/2011 | Cabral | G01C 21/3415 701/533 |
| 2011/0288765 | A1* | 11/2011 | Conway | G01C 21/3469 701/533 |
| 2011/0313647 | A1* | 12/2011 | Koebler | B60L 15/2045 701/123 |
| 2012/0123670 | A1* | 5/2012 | Uyeki | B60L 11/1838 701/300 |
| 2012/0203409 | A1* | 8/2012 | Sekijima | G01C 21/3469 701/22 |
| 2012/0323413 | A1* | 12/2012 | Kedar-Dongarkar | B60K 6/442 701/22 |
| 2013/0096745 | A1* | 4/2013 | Hussain | B60W 20/00 701/22 |
| 2013/0096746 | A1* | 4/2013 | Hussain | B60W 10/02 701/22 |
| 2013/0096747 | A1* | 4/2013 | Hussain | B60W 10/06 701/22 |
| 2013/0096748 | A1* | 4/2013 | Hussain | B60W 10/06 701/22 |
| 2013/0096749 | A1* | 4/2013 | Hussain | B60K 6/46 701/22 |
| 2013/0218366 | A1* | 8/2013 | Fukuda | G06F 17/00 701/1 |
| 2015/0275787 | A1* | 10/2015 | Dufford | F02D 29/02 701/102 |
| 2015/0298555 | A1* | 10/2015 | Bennett | B60L 1/003 701/22 |
| 2015/0316389 | A1* | 11/2015 | Inoue | B60L 11/1838 701/521 |
| 2016/0014252 | A1* | 1/2016 | Biderman | B60L 15/20 455/420 |
| 2016/0039427 | A1* | 2/2016 | Storm | B60L 3/12 701/22 |
| 2016/0075175 | A1* | 3/2016 | Biderman | A61B 5/222 301/6.5 |
| 2016/0075177 | A1* | 3/2016 | Biderman | B60L 3/003 301/6.5 |
| 2016/0075226 | A1* | 3/2016 | Biderman | A61G 5/04 301/6.5 |
| 2016/0082772 | A1* | 3/2016 | Biderman | A61G 5/045 301/6.5 |
| 2017/0010116 | A1* | 1/2017 | Inoue | B60L 1/003 |

FOREIGN PATENT DOCUMENTS

| | | |
|---|---|---|
| JP | 2010-286460 A | 12/2010 |
| JP | 2011-38845 A | 2/2011 |
| JP | 2011-174753 A | 9/2011 |
| JP | 2011-185785 A | 9/2011 |
| JP | 2011-229362 A | 11/2011 |
| JP | 2012-181183 A | 9/2012 |

* cited by examiner

US 9,733,098 B2

VEHICLE INFORMATION PROVIDING DEVICE

This application is a U.S. National stage application of International Application No. PCT/JP2013/065167, filed May 31, 2013, which claims priority to Japanese Patent Application No. 2012-284275 filed in Japan on Dec. 27, 2012. The entire disclosure of the Japanese Patent Application No. 2012-284275 is hereby incorporated herein by reference.

BACKGROUND

Field of the Invention

The present invention relates to an information providing device for a vehicle that provides information such as information regarding the power consumption and charging hubs when driving a vehicle with an electric motor as a drive source to a destination.

Background Information

Conventionally, a technology is known in which, in a vehicle with an electric motor as a drive source, a route to the destination is searched for, and the power to be consumed when driving a route based on the power consumption for the entire length of the searched for route, as well as per a predetermined unit of distance (hereinafter, also referred to as the theoretical performance of the vehicle) is predicted (refer to, for example, Japanese Laid-Open Patent Application No. 2011-38845). In the technology of Japanese Laid-Open Patent Application No. 2011-38845, when the predicted power consumption is greater than the charged amount of the battery for running the vehicle, the route, as well as information regarding the charging points that are points where the battery for running the vehicle can be charged, is provided.

SUMMARY

Since the conventional technology described above predicts the power consumption based on the theoretical performance of the vehicle, for example, when there is a deviation between the actual performance and the theoretical performance of the vehicle, there is the possibility that the predicted value of the power consumption will deviate from the actual power consumption. Consequently, there were cases in which the above-described conventional technology could not appropriately provide the information to be provided to the user. In view of the point described above, an object of the present invention is to allow the provision of information regarding the power consumption and information regarding charging hubs that are in accordance with the actual environment.

In the present invention, in order to solve the problem described above, when at least one from among the driving location information, the power consumption information, and the charging position information is sequentially acquired from an on-vehicle device provided to a vehicle with an electric motor as a drive source and is accumulated as the driving history information, and when a presentation route is determined by referring to the accumulated driving history information, a predetermined range including a departure point is set as a departure point range; a predetermined range including a destination point input using an input unit is set as a destination point range, with reference to the accumulated driving history information, to determine, as the presentation route, a route traveled from the departure point range to the destination point range, from among the routes traveled by the vehicle; and information related to the power consumption and/or the charging hubs corresponding to the presentation route is provided. Also, in the present invention, when there are no routes from the departure point range to the destination point range within a preset, predetermined range, the search conditions are changed, and the search is performed again.

According to the present invention, power that is consumed when a vehicle travels and charging hubs are determined with reference to the driving history information, that is, the information that is acquired while the vehicle actually travels; as a result, providing information regarding the power consumption according to the actual environment and information regarding the charging hubs is possible according to the present invention.

BRIEF DESCRIPTION OF THE DRAWINGS

Referring now to the attached drawings which form a part of this original disclosure.

DETAILED DESCRIPTION OF THE EMBODIMENTS

Figure 1:
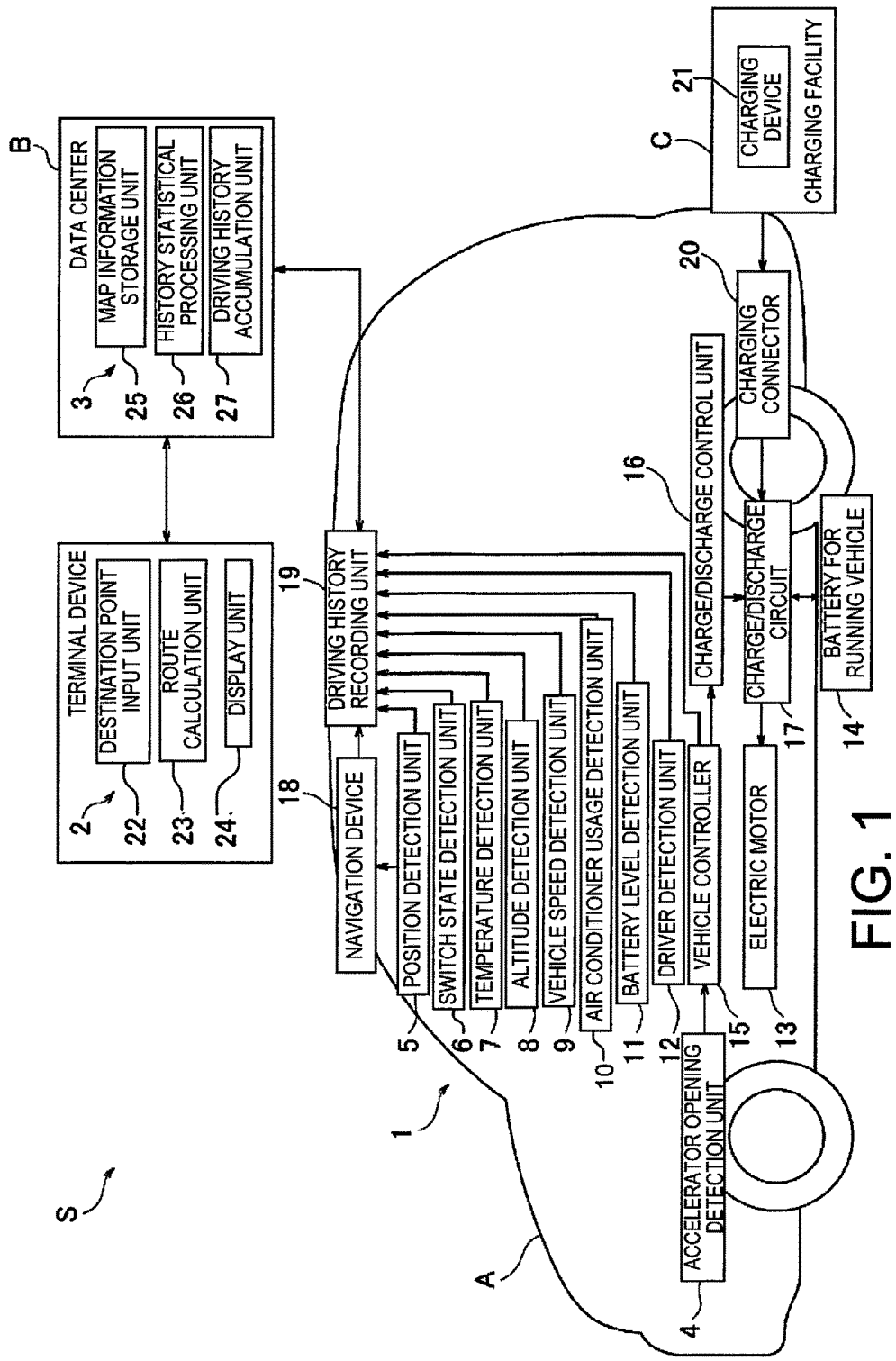
FIG. 1 is a view illustrating a schematic overview of a vehicle information provision system S.

FIG. 1 is a view illustrating a schematic overview of a vehicle information provision system S according to the present embodiment. As illustrated in FIG. 1, the vehicle information provision system S of the present embodiment comprises a vehicle-mounted device 1 that is mounted to a plurality of vehicles A having an electric motor 13 as a drive source, a terminal device 2 possessed by the owner of the vehicle A, and an vehicle information providing device 3 present in a data center B. The vehicle-mounted device 1 and the vehicle information providing device 3, as well as the terminal device 2 and the vehicle information providing device 3, send and receive various types of information via a communication path. Examples of communication paths include a cellular telephone network, a wireless LAN network, a DSRC (Dedicated Short-Range Communications) network, a power line communication network, etc. For example, the configuration can be such that both the vehicle-mounted device 1 and the vehicle information providing device 3 store various types of information in a removable storage medium, such as flash memory, and they send and receive the various types of stored information via a terminal having a communication function.

The vehicle-mounted device 1 comprises an accelerator opening detection unit 4, a position detection unit 5, a switch state detection unit 6, a temperature detection unit 7, an altitude detection unit 8, a vehicle speed detection unit 9, an air conditioner temperature detection unit 10, a battery level detection unit 11, and a driver detection unit 12.

The accelerator opening detection unit 4 detects the accelerator opening of a host vehicle A. Then, the accelerator opening detection unit 4 outputs the information regarding the detection results to a vehicle controller 15 described below. The position detection unit 5 detects the current position of the host vehicle A (for example, the latitude and the longitude) based on a GPS signal transmitted by a GPS (Global Positioning System) satellite. Then, the position detection unit 5 will output the information regarding the detection results to a navigation device 18, as described below.

The switch state detection unit 6 detects the switch state of an ignition switch of the host vehicle A. The switch states of the ignition switch may be, for example, an ON state and an OFF state. The switch state detection unit 6 outputs information regarding the detection results to a driving history recording unit 19, as described below. The temperature detection unit 7 detects the outside temperature of the current position of the host vehicle A. The temperature detection unit 7 outputs information regarding the detection results to the driving history recording unit 19, as described below.

The altitude detection unit 8 detects the altitude of the current position of the host vehicle A. Then, the altitude detection unit 8 outputs information regarding the detection results to the driving history recording unit 19, as described below. The vehicle speed detection unit 9 detects the vehicle speed of the host vehicle A. Then, the vehicle speed detection unit 9 outputs information regarding the detection results to the driving history recording unit 19, as described below. The air conditioner temperature detection unit 10 detects the set temperature of the air conditioner of the host vehicle A. The air conditioner temperature detection unit 10 outputs the information regarding the detection results to the driving history recording unit 19, as described below.

The battery level detection unit 11 detects the battery level of the vehicle A. In the present embodiment, the battery level can be the remaining charge of the battery 14 for running the vehicle for supplying electric power to the electric motor 13, which is the drive source. Then, the battery level detection unit 11 outputs information regarding the detection results to the driving history recording unit 19, as described below. The driver detection unit 12 detects the driver ID (Identification) of the driver of the host vehicle A. A driver ID can be, for example, a number, etc. for uniquely identifying the driver. Then, the driver detection unit 12 outputs information regarding the detection results to the driving history recording unit 19, as described below.

The vehicle-mounted device 1 also comprises a vehicle controller 15, a charge/discharge control unit 16, a charge/discharge circuit 17, a navigation device 18, a regenerative skill calculation unit 18a, and a driving history recording unit 19.

The vehicle controller 15 acquires the information (accelerator opening) output by the accelerator opening detection unit 4. Then, the vehicle controller 15 outputs the acquired information to the driving history recording unit 19. The vehicle controller 15 outputs a control command to the charge/discharge control unit 16 to supply electric power corresponding to the accelerator opening to the electric motor 13, based on the acquired information (the accelerator opening).

Following the control command from the vehicle controller 15, the charge/discharge control unit 16 outputs a control command to the charge/discharge circuit 17 to supply the electric power that is stored by the battery 14 for running the vehicle to the electric motor 13. Additionally, the charge/discharge control unit 16 detects the charging state and the charging time of the battery 14 for running the vehicle. The charging states may be, for example, the distinction between currently charging and not currently charging. The charging time may be, for example, the time from starting charging to finishing charging. Then, the charge/discharge control unit 16 outputs information regarding the detection results to the travel history storage unit 19.

The charge/discharge circuit 17 supplies the electric power stored by the battery 14 for running the vehicle to the electric motor 13, following the control command from the charge/discharge control unit 16. The electric motor 13 thereby generates a drive force. The charge/discharge circuit 17 connects with a charging device 21 via a charging connector 20. This type of charging device 21 may be, for example, a device for supplying electric power for charging the battery 14 for running the vehicle, which is provided in a charging facility C that is provided outside the vehicle A. Then, electric power from the charging device 21 is supplied to the charge/discharge circuit 17, with the charging connector 20 being connected to the charging device 21, and the battery 14 for running the vehicle is thereby charged.

The navigation device 18 acquires the information (the latitude and the longitude (the current position of the vehicle A)) that is output by the position detection unit 5. Then, the navigation device 18 presents information to the driver for guiding the vehicle A along a route from an departure point $P_O$ to a destination point $P_D$, which are set by the driver, based on the acquired information (the latitude and the longitude (the current position of the vehicle A)). Additionally, the navigation device 18 outputs the acquired information and the route to the driving history recording unit 19.

The regenerative skill calculation unit 18a calculates information regarding the regenerative skills of the driver (that is, information regarding the regenerative efficiency) when a driver drives a vehicle A. Then, the regenerative skill calculation unit 18a outputs the regenerative skill information to a driving history recording unit 19 mentioned below, in association with the driver ID information that is detected by the driver detection unit 12. The regenerative skill information thereby becomes information that is set for each driver. The regenerative skills of the driver may be obtained by, for example, acquiring information regarding the power consumption of the battery 14 for running the vehicle and the regenerative power information and by calculating the ratio of the power consumption and the regenerative power.

The driving history recording unit 19 executes a driving history information recording operation, based on the information output from the various detection units 6-12, the vehicle controller 15, the charge/discharge control unit 16, the navigation device 18, and the regenerative skill calculation unit 18a.

In the driving history information recording operation, a first piece of driving history information and a second piece of driving history information described below are recorded. Then, the driving history recording unit 19 transmits the recorded first piece of driving history information and the second piece of driving history information to the vehicle information providing device 3. The details regarding the first piece of driving history information, the second piece of driving history information, and the driving history information recording operation are described below.

On the other hand, the terminal device 2 comprises an input unit 22 for destination points, etc., a route calculation unit 23, and a display unit 24. The terminal device 2 may be, for example, a mobile phone terminal, a personal computer, etc. possessed by the owner of the vehicle A.

The input unit 22 for destination points, etc., receives an input regarding the departure point $P_O$, the destination point $P_D$, the battery level (for example, the battery level of the vehicle A that is possessed by the user), and the driver ID (for example, the driver ID that identifies the user) from the user of the terminal device 2. At this time, the terminal device 2 communicates with the vehicle-mounted device 1, which is mounted on the host vehicle A, and acquires information regarding the air conditioner and outside temperature difference, which is the difference between the set temperature of the air conditioner and the outside temperature, from the information regarding the outside temperature of the current location of the host vehicle A that is detected by the temperature detection unit 7 and information regarding the set temperature of the air conditioner of the host vehicle A that is detected by the air conditioner temperature detection unit 10. The input unit 22 for destination points, etc., then outputs information such as the received departure point $P_O$, the destination point $P_D$, the battery level, and the driver ID, as well as information regarding the air conditioner and outside temperature difference of the host vehicle A and information regarding the current date/time, the day of week, the season, and the weather, to the route calculation unit 23 as the input information, for destination points, etc.

The route calculation unit 23 executes a route provision operation, based on the destination point input information that is output from the input unit 22 for destination points, etc. In the route provision operation, the route calculation unit 23 transmits the search request for the presentation route (hereinafter also referred to as the presentation route search request) to the vehicle information providing device 3. Next, the route calculation unit 23 receives information regarding the presentation route, on the power that is consumed when driving along the presentation route, and on the location of the charging facilities C (hereinafter also referred to as the charging hubs) that will be traversed when driving along the presentation route from the vehicle information providing device 3. The route calculation unit 23, upon receiving the information from the vehicle information providing device 3, outputs a control signal for displaying the received information to the display unit 24. The details of the route provision operation will be described below. In the present embodiment, an example is described in which the terminal device 2 executes the route provision operation, but another configuration may also be used. That is, for example, the configuration may be such that the position detection unit 5, the route calculation unit 23, and the display unit 24 are realized by a navigation device 18 provided to the vehicle A, and the route provision operation is executed therewith.

Figure 2:
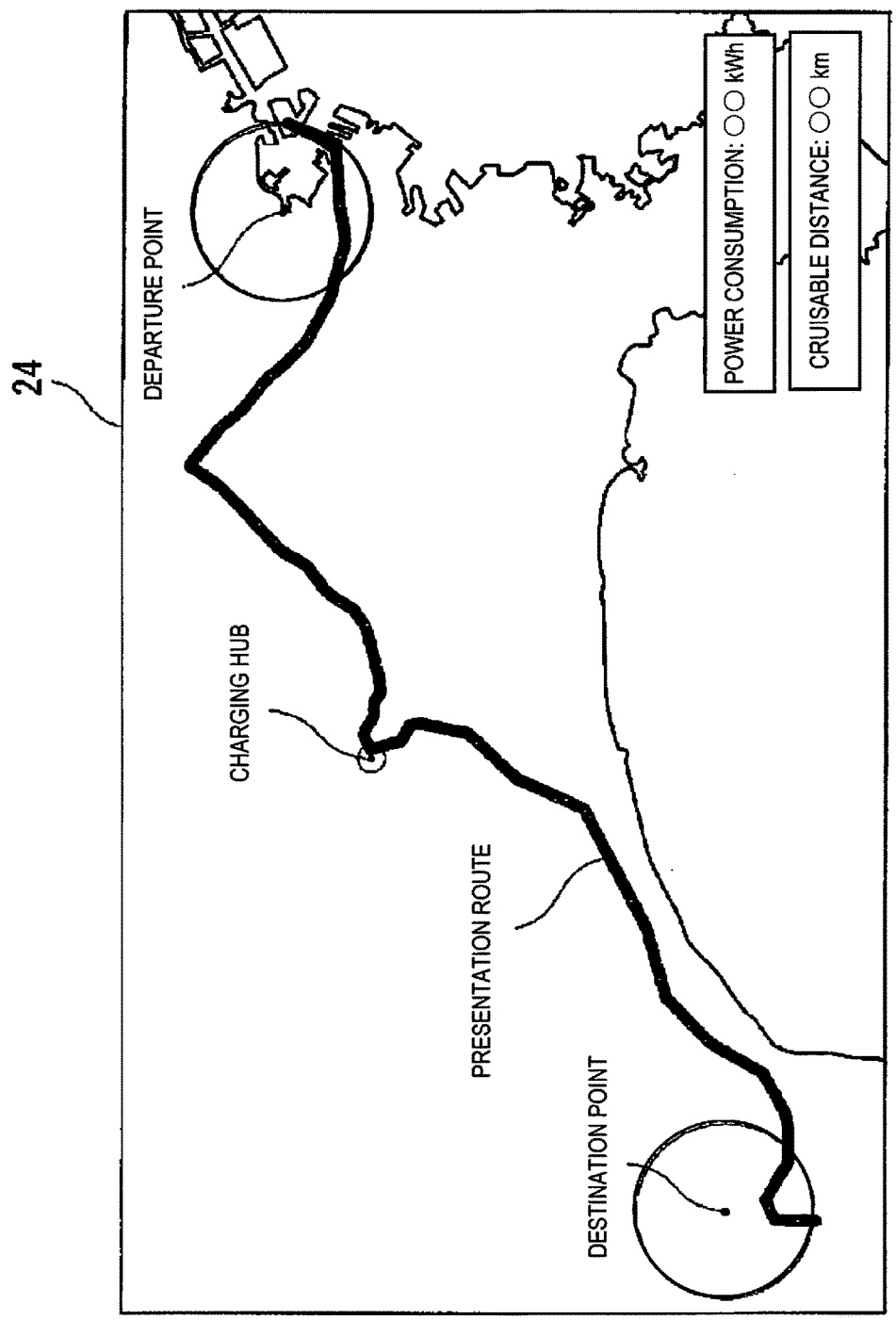
FIG. 2 is a view illustrating one example of the contents displayed by a display unit.

Here, FIG. 2 is a view illustrating one example of the contents displayed by a display unit 24. The display unit 24 displays on the display screen information regarding the presentation route, the power that is consumed when driving along the presentation route, and the charging hubs that will be traversed when driving along the presentation route, following the control command being output by the route calculation unit 23, as illustrated in FIG. 2. The user of the terminal device 2 can thereby confirm beforehand the power consumption and the charging hubs when driving the vehicle A to the destination point.

Returning to FIG. 1, the vehicle information providing device 3 comprises a map information storage unit 25, a driving history accumulation unit 26, and a historical statistics processing unit 27.

The map information storage unit 25 stores the map information for the region where the vehicle A is traveling. The map information may be, for example, information such as nodes and links that represent a road network, the locations of charging facilities C for charging the battery 14 for running the vehicle, which is provided to the vehicle A, toll roads, and the locations of facilities that are attached to toll roads.

The driving history accumulation unit 26 executes the history information accumulation operation based on the first piece of driving history information and the second piece of driving history information that are transmitted from the vehicle-mounted device 1. Specifically, in the history information accumulation operation, the driving history accumulation unit 26 sequentially receives (acquires) the first piece of driving history information and the second piece of driving history information that are transmitted by the vehicle-mounted device 1. Then, the driving history accumulation unit 26 accumulates the received first piece of driving history information and the second piece of driving history information as the driving history information.

The historical statistics processing unit 27 executes driving history statistical processing by referencing the presentation route search request transmitted from the terminal device 2, the map information stored in the map information storage unit 25, and the driving history information (the first piece of driving history information, the second piece of driving history information) accumulated by the driving history accumulation unit 26.

In the driving history statistical processing step, first, the historical statistics processing unit 27 searches for (acquires) a planned route from a departure point $P_O$ to the destination point $P_D$ by referencing the map information that is stored by the map information storage unit 25, based on the presentation route search request that is transmitted by the route calculation unit 23. A planned route may be any route that is able to reach a destination point $P_D$ from a departure point $P_O$ and is not particularly limited; for example, a route that is capable of being traveled from a departure point $P_O$ to a destination point $P_D$ in the shortest amount of time is set.

Next, in the driving history statistical processing step, the historical statistics processing unit 27 determines the same or a similar presentation route to the searched for (acquired) planned route by referencing the driving history information (the first piece of driving history information) that is accumulated by the driving history accumulation unit 26. This type of method for determining a presentation route will be described below. Next, the historical statistics processing unit 27 determines the power that actually has been consumed by the vehicle A, as well as the charging hubs that will be traversed when driving along the presentation route by referencing the driving history information (the first piece of driving history information, the second piece of driving history information) that is accumulated by the driving history accumulation unit 26. Then, the historical statistics processing unit 27 transmits (provides) the selected presentation route, the power consumption, and the charging hub information to the vehicle-mounted device 1. The vehicle-mounted device 1 thereby presents the presentation route, the power that is consumed upon traveling along the presentation route, and the charging hubs that will be traversed when driving along the presentation route, based on the information output by the historical statistics processing unit 27. The details of the driving history statistical processing step will be described below.

Travel History Information Recording Operation

Figure 3:
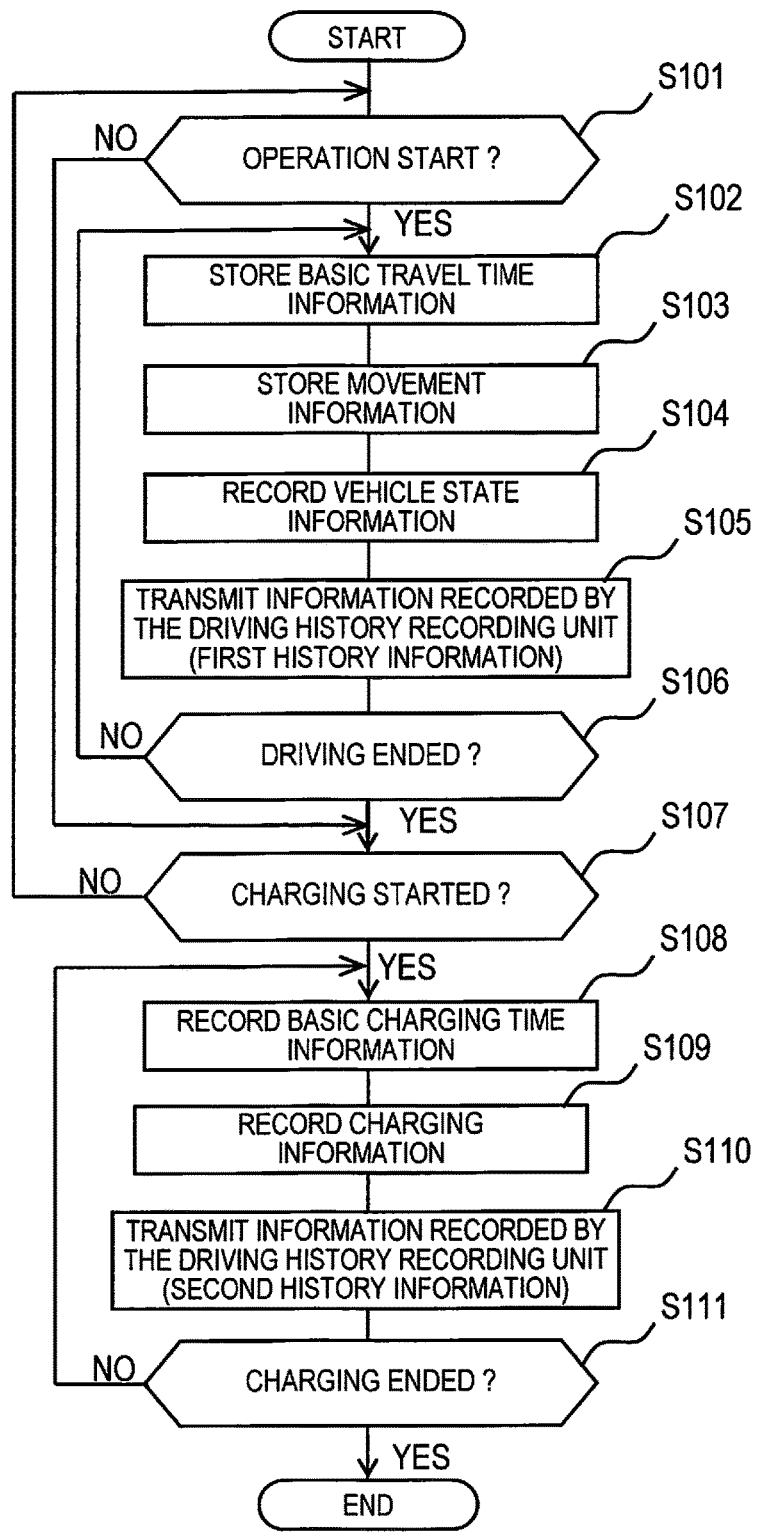
FIG. 3 is a flowchart representing the driving history information recording operation.

Next, the driving history information recording operation that is executed by the driving history recording unit 19 will be described. The driving history recording unit 19 executes a driving history information recording operation each time a predetermined amount of time (for example, 10 milliseconds) has elapsed. FIG. 3 is a flowchart representing the driving history information recording operation.

In step S101, the driving history recording unit 19 determines whether or not the driver has started driving the vehicle A, as illustrated in FIG. 3. Specifically, the driving history recording unit 19 determines whether or not the ignition switch is in an ON state, based on the information (the switch state of the ignition switch) that is output by the switch state detection unit 6. Then, when a determination is made that the ignition switch is in the ON state (step S101=Yes), the driving history recording unit 19 determines that the driver has started driving the vehicle A, and the operation proceeds to step S102. On the other hand, when a determination is made that the ignition switch is in the OFF state (step S101=No), the driving history recording unit 19 determines that the driver has not started driving the vehicle A, and the operation proceeds to step S107.

When a determination is made that the driver has started driving the vehicle A, the operation proceeds to step S102; in step S102, the driving history recording unit 19 records the vehicle ID information, which specifies the vehicle A, the driver ID information, which is output from the driver detection unit 12, the temperature information, which is output from the temperature detection unit 7, and the current date and time information as the basic travel time information. That is, in the present embodiment, the basic travel time information is information comprising the vehicle ID information, the driver ID information, the temperature information, and the current date and time information.

Next, the operation proceeds to step S103, and the driving history recording unit 19 records the latitude and longitude information, as well as the altitude information, that are output from the position detection unit 5 and the altitude detection unit 8, along with the route information (hereinafter also referred to as the driving location information) as the movement information. That is, in the present embodiment, the movement information includes the latitude and longitude information, the altitude information, and the route information (the driving location information). For example, since the vehicle A can be considered to be traveling along a route that is presented by the navigation device 18, information that is output by the navigation device 18 (route) can be employed as the route.

The operation then proceeds to step S104, and the driving history recording unit 19 records the vehicle speed information, the accelerator opening information, and the air conditioner set temperature information output from each of the detection units 4, 8, 9, 10 as the vehicle state information. When traveling along the route provided by the navigation device 18 has been completed, the driving history recording unit 19 includes information regarding the power that was consumed upon traveling the route (hereinafter also referred to as the power consumption information) and information regarding the regenerative skill that is calculated by the regenerative skill calculation unit 18a in the vehicle state information to be recorded. That is, in the present embodiment, the vehicle state information includes the vehicle speed information, the accelerator opening information, the air conditioner set temperature information, information regarding the power consumption (the power consumption information), and the regenerative skill information. As an example of a calculation method, the power consumption can be calculated by subtracting the battery level at the time of reaching the destination point $P_D$ from the battery level at the time of departing from the departure point $P_O$ of the route.

The operation then proceeds to step S105, and the driving history recording unit 19 transmits information comprising the basic travel time information, the movement information, and the vehicle state information recorded by the driving history recording unit 19 to the vehicle information providing device 3 as the first piece of driving history information.

The operation then proceeds to step S106, and the driving history recording unit 19 determines whether or not the driver has finished driving the vehicle A. Specifically, the driving history recording unit 19 determines whether or not the ignition switch is in an OFF state, based on the information regarding the switch state of the ignition switch that is output by the switch state detection unit 6. Then, when a determination is made that the ignition switch is in the OFF state (step S106=Yes), the driving history recording unit 19 determines that the driver has finished driving the vehicle A, and the operation proceeds to step S107. On the other hand, when a determination is made that the ignition switch is in the ON state (step S106=No), the driving history recording unit 19 determines that the driver has not finished driving the vehicle A, the operation returns step S102, and the operations of steps S102-S106 are repeatedly executed until a determination is made that the driver has finished driving the vehicle A.

When a determination is made that the driver has finished driving the vehicle A, the operation proceeds to step S107; in step S107, the driving history recording unit 19 determines whether or not the battery 14 for running the vehicle has started charging. Specifically, the driving history recording unit 19 determines whether or not the battery 14 for running the vehicle is in a charging state based on the charging state information of the battery 14 for running the vehicle that is output from the charge/discharge control unit 16. Then, when a determination is made that the battery 14 for running the vehicle is in a charging state (step S107=Yes), the driving history recording unit 19 determines that the battery 14 has started charging, and the operation proceeds to step S108. On the other hand, when a determination is made that the battery 14 for running the vehicle is not in a charging state (step S107=No), the driving history recording unit 19 determines that the battery 14 for running the vehicle has not started charging, the operation returns to step S101, and the operations of steps S101 and S107 are repeatedly executed until driving of the vehicle A starts (step S101=Yes) or until the battery 14 for running the vehicle has started charging (step S107=Yes).

When the battery 14 for running the vehicle has started charging, the operation proceeds to step S108; in step S108, the driving history recording unit 19 records the temperature information output from the temperature detection unit 7, as well as the current date and time information, as the basic charge time information. That is, in the present embodiment, the basic charge time information includes the temperature information and the current date and time information.

Next, the operation proceeds to step S109, and the driving history recording unit 19 stores the latitude and longitude information output from the position detection unit 5, the battery level detection unit 11, and the charge/discharge control unit 16 (hereinafter also referred to as the charging hub information, the charging position information), the charging amount information, and the charging time information as the charging information. That is, in the present embodiment, the charging information includes the latitude and longitude information (the charging hub information, the charging position information), the charging amount information, and the charging time information.

The operation then proceeds to step S110, and the driving history recording unit 19 transmits information comprising the basic charge time information and the charging information recorded by the driving history recording unit 19 to the vehicle information providing device 3 as the second piece of driving history information. At this time, the driving history recording unit 19 transmits the second piece of driving history information to the vehicle information providing device 3, along with the first piece of driving history information that was transmitted in step S105 described above. The route that the vehicle A traveled is thereby correlated with the charging hubs that were traversed when driving along the route.

The operation then proceeds to step S111, and the driving history recording unit 19 determines whether or not the battery 14 for running the vehicle has finished charging. Specifically, the driving history recording unit 19 determines whether or not the battery 14 for running the vehicle is in a charging state based on the charging state information of the battery 14 for running the vehicle that is output from the charge/discharge control unit 16. Then, when a determination is made that the battery 14 for running the vehicle is not in a charging state (step S111=Yes), the driving history recording unit 19 determines that the battery 14 for running the vehicle has finished charging, and the driving history information recording operation ends. On the other hand, when a determination is made that the battery 14 for running the vehicle is in a charging state (step S111=No), the driving history recording unit 19 determines that the battery 14 for running the vehicle has not finished charging, the operation returns to step S108, and the operations of steps S108-S111 are repeatedly executed until a determination is made that the battery 14 for running the vehicle has finished charging.

Route Provision Operation

Figure 4:
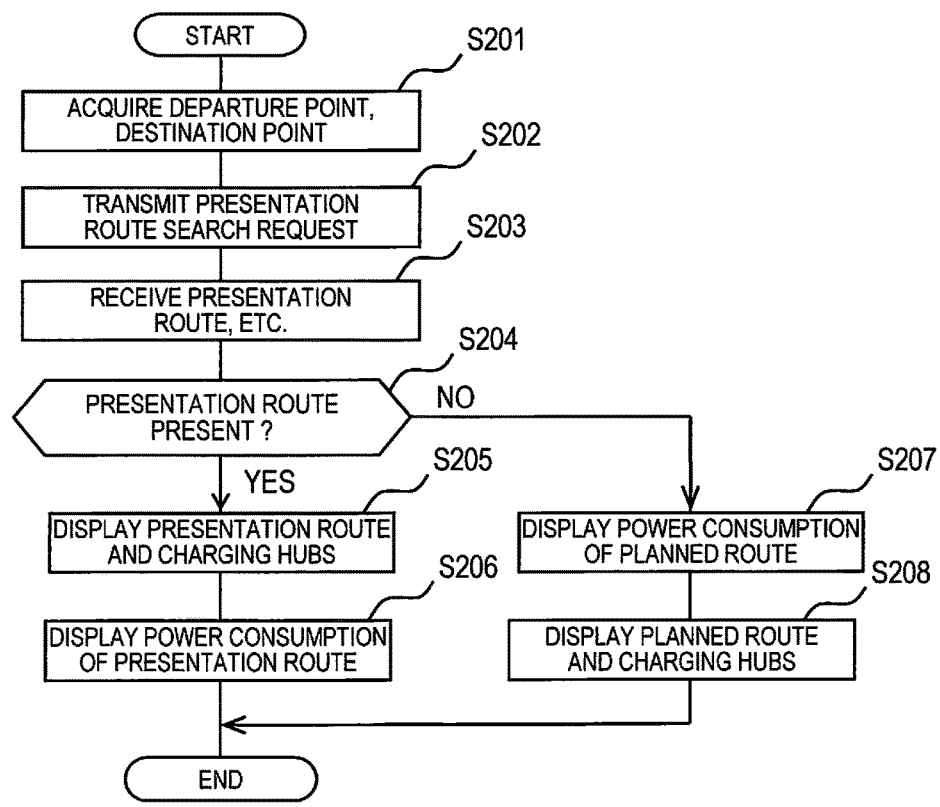
FIG. 4 is a flowchart representing the route provision operation.

Next, the route provision operation that is executed by the route calculation unit 23 will be described. The route calculation unit 23 executes a route provision operation described below when information regarding the departure point $P_O$, the destination point $P_D$, the battery level, and the driver ID are input by the input unit 22 for destination points, etc. FIG. 4 is a flowchart representing the route provision operation.

First, in step S201, the route calculation unit 23 acquires information regarding the departure point $P_O$, the destination point $P_D$, the battery level, and the driver ID; information regarding the outside temperature of the current location of the host vehicle A; information regarding the set temperature of the air conditioner; and information regarding the current date/time, the day of week, the season, and the weather, which are output by the input unit 22 for destination points, etc., as illustrated in FIG. 4.

The operation then proceeds to step S202, and the route calculation unit 23 transmits a presentation route search request to the vehicle information providing device 3. Specifically, the route calculation unit 23 transmits the presentation route search request, along with the destination point input information acquired in step S201 described above, to the vehicle information providing device 3.

Then, in response to the presentation route search request that is output from the route calculation unit 23, the historical statistics processing unit 27 of the vehicle information providing device 3 searches for (acquires) the planned route from the departure point to the destination point by referencing the map information that is stored in the map information storage unit 25. Next, the historical statistics processing unit 27 searches for a route that is identical or similar to the planned route (hereinafter referred to as the similar route) by referencing the first piece of driving history information that is accumulated by the driving history accumulation unit 26 and determines the searched similar route to be the presentation route. The method for deciding a presentation route will be described below. The historical statistics processing unit 27 then determines the power that has been consumed when driving along the decided presentation route, as well as the charging hubs that will be traversed when driving along the presentation route, by referencing the first piece of driving history information and the second piece of driving history information, which are accumulated by the driving history accumulation unit 26. The method for determining the power consumption and the charging hubs will be described below. Then, the historical statistics processing unit 27 transmits (provides) the selected presentation route, the power consumption, and the charging hub information to the terminal device 2. For example, when a presentation route cannot be determined (calculated), such as when a corresponding similar route does not exist, the historical statistics processing unit 27 transmits (provides) information regarding the searched planned route, instead of the presentation route information, to the terminal device 2.

The operation then proceeds to step S203, and the route calculation unit 23 receives information including the presentation route information, the power consumption information, and the charging hub information, which are transmitted by the vehicle information providing device 3. If a presentation route could not be selected in step S202, the route calculation unit 23 receives the planned route information instead of the presentation route information.

The operation then proceeds to step S204, and the route calculation unit 23 determines whether or not the presentation route information was received in step S203. If the route calculation unit 23 determines that the presentation route information has been received (step S204=Yes), the operation proceeds to step S205. On the other hand, if the route calculation unit 23 determines that the planned route information has been received instead of the presentation route information (step S204=No), the operation proceeds to step S207.

If a determination is made that the presentation route information has been received, the operation proceeds to step S205; in step S205, the route calculation unit 23 outputs a control command to the display unit 24 to display the presentation route information and the charging hub information from the information acquired in the above-described step S203 (the presentation route information, the power consumption information, and the charging hub information).

Next, in step S206, the route calculation unit 23 outputs a control command to the display unit 24 to display the power consumption information from the information acquired in the above-described step S203 (the presentation route information, the power consumption information, and the charging hub information), after which the route provision operation ends. A display such as that illustrated in FIG. 2 is thereby displayed on the display screen.

On the other hand, if a determination is made that the presentation route information has not been received, the operation proceeds to step S207; in step S207, the route calculation unit 23 outputs a control command to the display unit 24 to display the planned route information and the charging hub information from the information acquired in the above-described step S203 (the planned route information, the power consumption information, and the charging hub information).

Next, in step S208, the route calculation unit 23 outputs a control command to the display unit 24 to display the power consumption information from the information acquired in the above-described step S203 (the planned route information, the power consumption information, and the charging hub information), after which the route provision operation ends. A display such as that illustrated in FIG. 2 is thereby displayed on the display screen.

History Accumulation Operation

Figure 5:
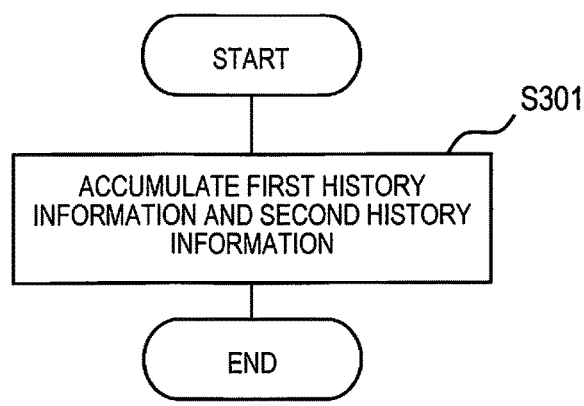
FIG. 5 is a flowchart representing the history accumulation operation.

Next, the history accumulation operation that is executed by the driving history accumulation unit 26 will be described. The driving history accumulation unit 26 executes the history accumulation operation when receiving the first piece of driving history information or the second piece of driving history information from the route calculation unit 23. FIG. 5 is a flowchart representing the history accumulation operation.

In step S301, the driving history accumulation unit 26 accumulates the received first piece of driving history information or the second piece of driving history information as the driving history information, and the history accumulation operation ends, as illustrated in FIG. 5. At this time, the driving history accumulation unit 26 includes information regarding the presence/absence of traffic jams, the day of the week, the season, the weather, the travel time zone, the travel power consumption, and the average speed in the driving history information (the first piece of driving history information, the second piece of driving history information) to be accumulated. For example, the presence/absence of traffic jams on the traveling date/time and along the route, which are included in the first piece of driving history information, can be detected, and the detected information can be used as the information regarding the presence/absence of traffic jams. Information regarding the day of the week may be, for example, the day of the week associated with the traveling date/time, which is included in the first piece of driving history information. Information regarding the season may be, for example, the season associated with the traveling date/time, which is included in the first piece of driving history information. Additionally, the weather on the traveling date/time and at the latitude and longitude, which are included in the first piece of driving history information, can be detected, and the detected information can be used as the information regarding the weather. Information regarding the time zone may be, for example, the time zone associated with the traveling date/time, which is included in the first piece of driving history information. Information regarding the travel power consumption may be, for example, the amount of decrease in the battery level per unit of time while traveling, which is included in the first piece of driving history information. Information regarding the average speed may be, for example, the average value of the vehicle speed over a set period of time (for example, 10 minutes), which is included in the first piece of driving history information.

In the present embodiment, an example was described in which the driving history recording unit 19 uses the route information that is output from the navigation device 18 as the route, but another configuration may also be employed. For example, if the route in the first piece of driving history information includes a portion for which the vehicle A traveled a different route, the driving history accumulation unit 26 corrects the above to the route that the vehicle A actually traveled, based on the driving history information (the latitude and longitude), which is accumulated by the driving history accumulation unit 26. The driving history accumulation unit 26 thereby accumulates information regarding the route that the vehicle A actually traveled. A latitude and longitude sequence or a road link string after a common dead reckoning or a latitude and longitude sequence or a road link string after map matching may be employed as the information regarding the actually traveled route. Dead reckoning is location information that is obtained by, for example, correcting GPS latitude and longitude information detected by the position detection unit 5 with respect to the speed information provided by the vehicle speed detection unit 9. A method for increasing the correction accuracy by considering the gyro-sensor (acceleration sensor) information, which is not diagrammed, is also known. Map matching is known as a method for detecting the most likely location on the road by detecting whether or not one is traveling on a road by looking at both the GPS latitude and longitude information that is detected by the position detection unit 5 or the latitude and longitude after the above-described dead reckoning, as well as the road link, the node information, and, if during navigation guiding, the route information, which is possessed by the navigation device 18, and if on a road, determining which roads have been passed.

Driving History Statistical Processing

Next, the driving history statistical processing step that is executed by the historical statistics processing unit 27 will be described. The historical statistics processing unit 27 executes the history statistical processing step when receiving the presentation route search request that is transmitted by the terminal device 2. FIG. 6-FIG. 9 are flowcharts representing the driving history statistical processing step.

Figure 6:
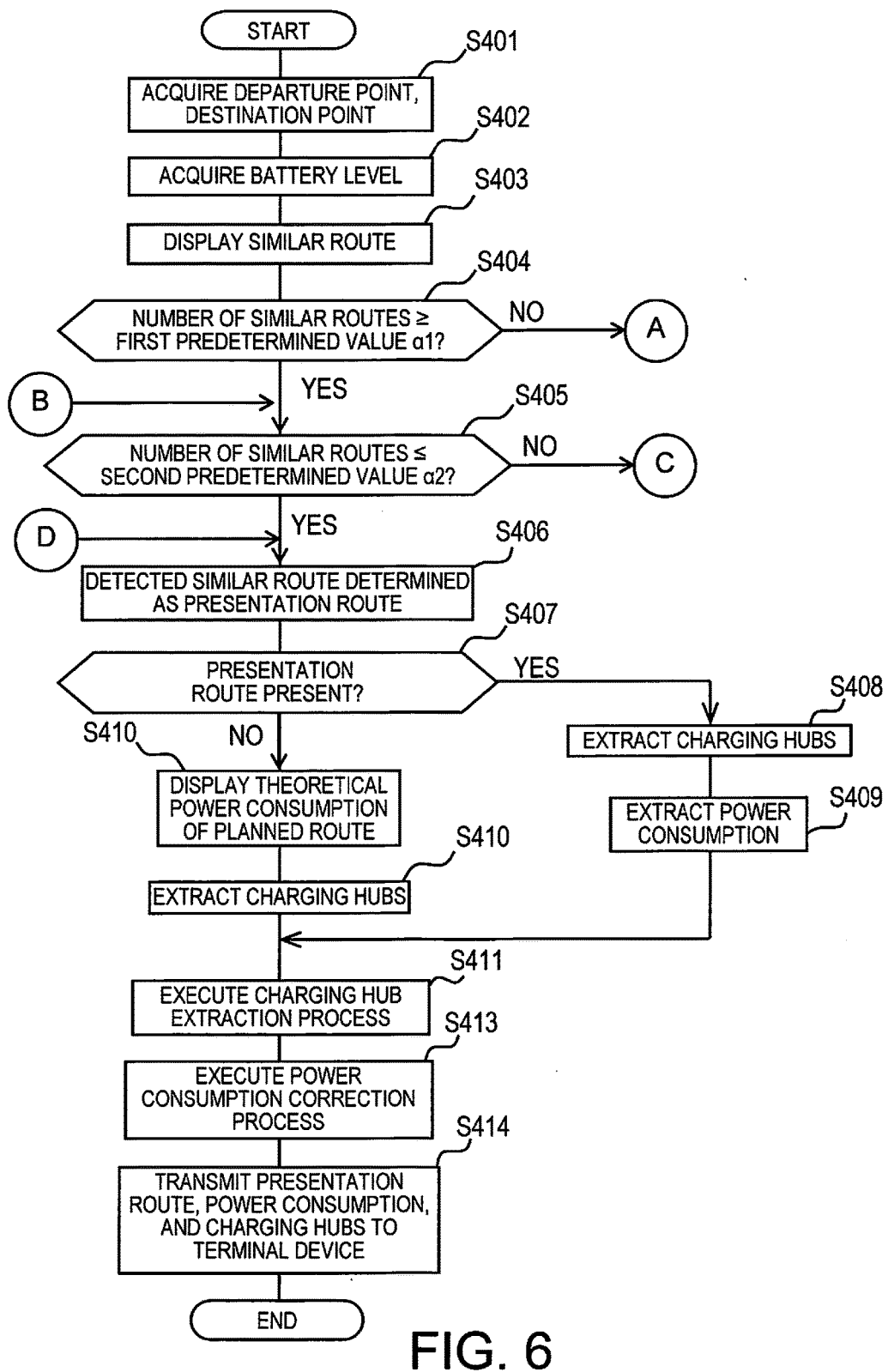
FIG. 6 is a flowchart (part 1) representing the driving history statistical processing step.

First, in step S401, the historical statistics processing unit 27 acquires the departure point $P_O$ and the destination point $P_D$ from the destination point input information, which is received along with the presentation route search request, as illustrated in FIG. 6. Next, the historical statistics processing unit 27 searches for (acquires) the planned route from the acquired departure point $P_O$ to the destination point $P_D$, based on the map information that is stored by the map information storage unit 25. A planned route may be any route that is able to reach a destination point $P_D$ from a departure point $P_O$ and is not particularly limited; for example, a route that is capable of leaving a departure point $P_O$ and reaching a destination point $P_D$ in the shortest amount of time is set.

In the present embodiment, an example was described in which the historical statistics processing unit 27 that is provided to the vehicle information providing device 3 searches for (acquires) a planned route, but another configuration may also be used. For example, the configuration may be such that a navigation device 18 provided to the vehicle-mounted device 1 searches for the planned route. In this case, the navigation device 18 transmits the search results of the planned route to the historical statistics processing unit 27, and the historical statistics processing unit 27 transmits (acquires) the planned route transmitted from the navigation device 18.

The operation then proceeds to step S402, and the historical statistics processing unit 27 acquires the battery level information from the destination point input information, which is received along with the presentation route search request. The method for acquiring the battery level information may be a method for making an inquiry to the battery level detection unit 11 of the vehicle A from the terminal device 2 via the data center B or a method in which the user inputs an arbitrary battery level. According to the former method, the calculation can be done based on the most recent battery level when actually departing; as a result, obtaining a result that is in line with the ordinary state at the current time is possible. According to the latter method, the user can specify the battery level beforehand; therefore, obtaining a result assuming a departure after the battery has been charged 100% is possible.

Figure 10:
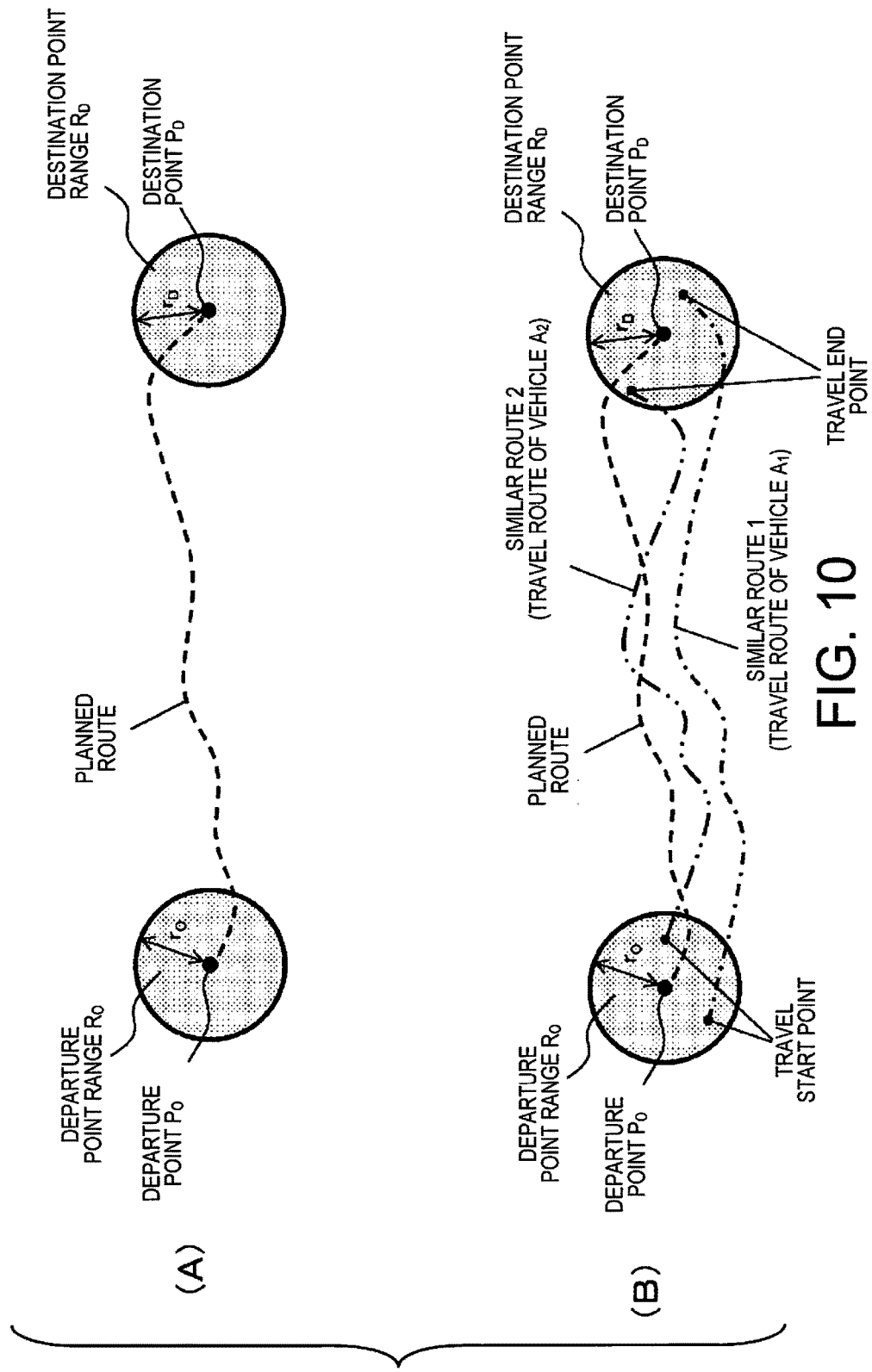
FIG. 10 is a view showing a method for searching for similar routes.

Next, the operation proceeds to step S403; in step S403, the historical statistics processing unit 27 executes a search for a similar route. Specifically, the historical statistics processing unit 27 sets the departure point range $R_O$ and the destination point range $R_D$ based on the departure point $P_O$ and the destination point $P_D$ included in the destination point input information, which is received along with the presentation route search request. FIG. 10 is a view showing a method for searching for similar routes of the present embodiment. In the present embodiment, the historical statistics processing unit 27 sets a circular range with a radius $r_O$ from the departure point $P_O$ as the departure point range $R_O$, and a circular range having a radius $r_D$ from the destination point $P_D$ is set as the destination point range $R_D$, as illustrated in part (A) of FIG. 10.

Next, from the first piece of driving history information (route) accumulated by the driving history accumulation unit 26, the historical statistics processing unit 27 searches for a route having a travel start point and a travel end point within the set departure point range $R_O$ and the destination point range $R_D$, and the searched route is detected as a similar route. Specifically, the historical statistics processing unit 27 sets a route for which the travel start point is within the departure point range $R_O$ and the travel end point is within the destination point range $R_D$ as a similar route. For instance, in the example illustrated in part (B) of FIG. 10, an example is shown in which two routes, "similar route 1" and "similar route 2", are detected in relation to the planned route that connects the departure point $P_O$ and the destination point $P_D$.

In the present embodiment, a predetermined distance (for example, 5 km) may be set as the radius $r_O$ and radius $r_D$, which define the magnitude (size) of the departure point range $R_O$ and the destination point range $R_D$.

The operation then proceeds to step S404, and the historical statistics processing unit 27 determines whether or not the number of similar routes detected in the above-described step S403 is equal to or greater than a preset first predetermined value α1. Then, if the historical statistics processing unit 27 determines that the number of detected similar routes is equal to or greater than the first predetermined value α1 (step S404=Yes), the operation proceeds to step S405. On the other hand, if the historical statistics processing unit 27 determines that the number of detected similar routes is less than the first predetermined value α1 (step S404=No), the operation proceeds to step S431 illustrated in FIG. 7. The first predetermined value α1 may be set to be a significant number for obtaining an average value of the power consumption for a plurality of similar routes when obtaining an average value of the power consumption for a plurality of similar routes in step S409 described below.

Figure 7:
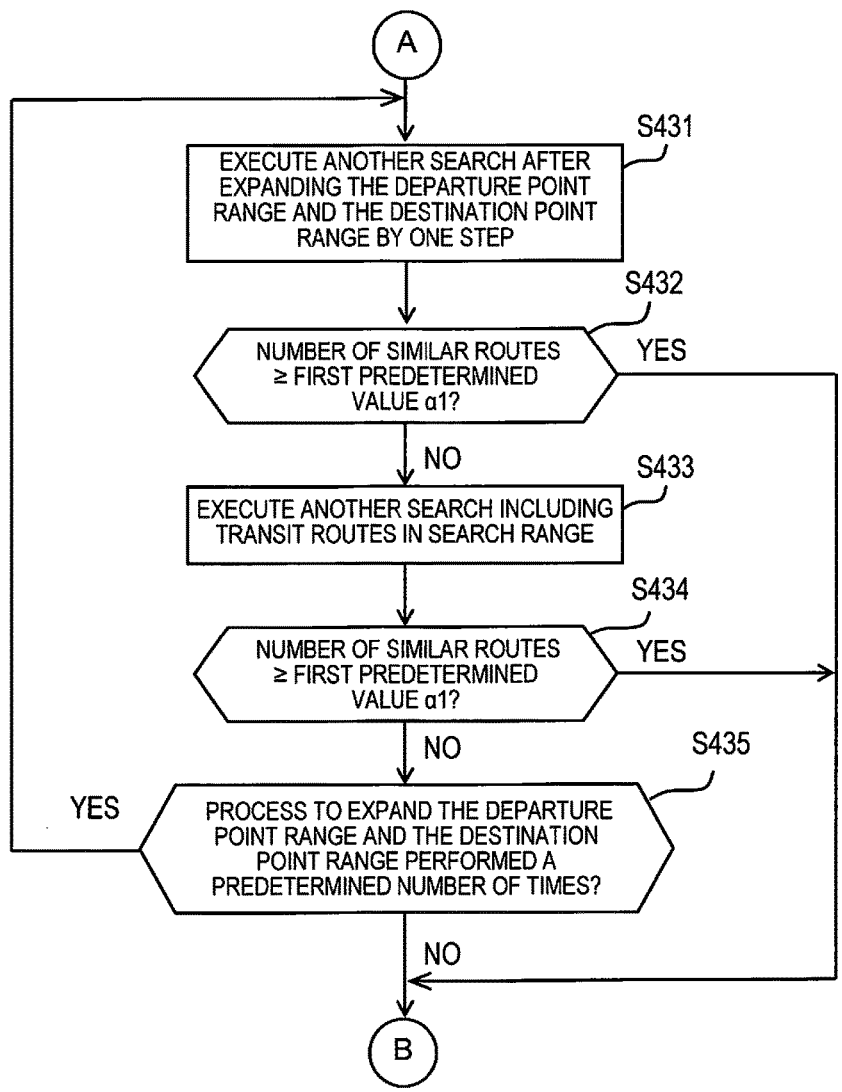
FIG. 7 is a flowchart (part 2) representing the driving history statistical processing step.

Then, if a determination is made in step S404 that the number of detected similar routes is less than the first predetermined value α1, the operation proceeds to step S431 illustrated in FIG. 7; in step S431, the departure point range $R_O$ and the destination point range $R_D$, which are set in the above-described step S403, are expanded by one step, and the search for a similar route is performed again. That is, in step S431, a route having a travel start point and a travel end point is searched for within the expanded departure point range $R_O'$ and the destination point range $R_D'$, and the detected route is selected as a similar route.

Figure 11:
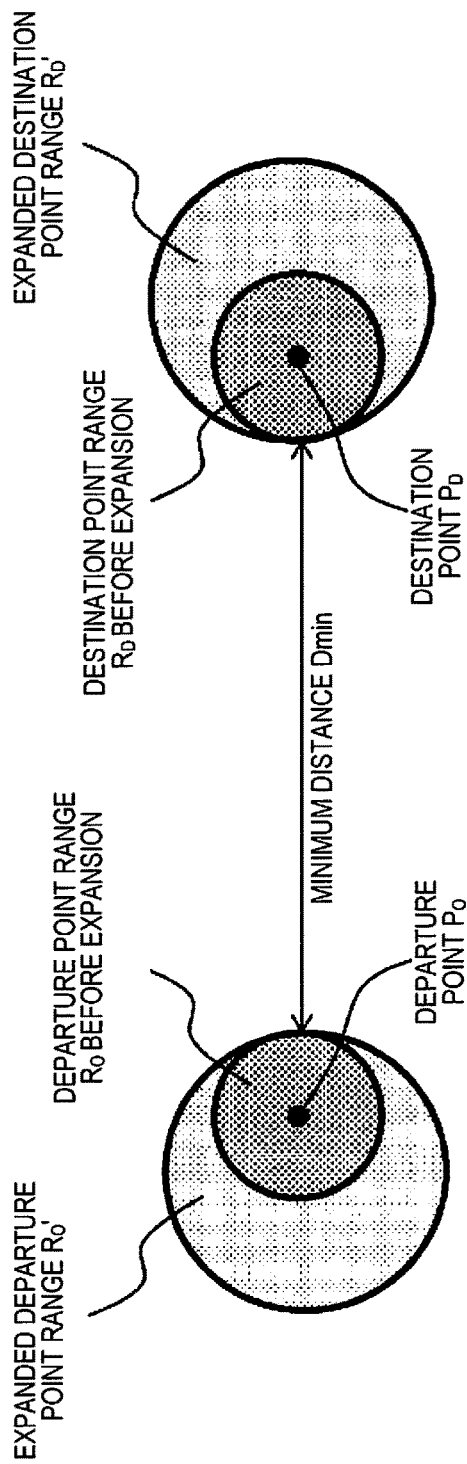
FIG. 11 is a view showing a method for expanding the departure point range $R_O$ and the destination point range $R_D$.

Here, a view showing a method for expanding the departure point range $R_O$ and the destination point range $R_D$ is illustrated in FIG. 11. In the present embodiment, when expanding the departure point range $R_O$ and the destination point range $R_D$, the historical statistics processing unit 27 expands the ranges in a state that maintains the minimum distance Dmin between the departure point range $R_O$ before expansion and the destination point range $R_D$ before expansion, that is, in a direction separating from each other, as illustrated in FIG. 11. According to the present embodiment, preventing a route with an excessively short travel distance (that is, a route with an excessively low power consumption) from being detected as a similar route, in relation to the planned route set in step S401, is possible by expanding the departure point range $R_O$ and the destination point range $R_D$ in a state that maintains the minimum distance Dmin. If a route with an excessively short travel distance (that is, a route with an excessively low power consumption) is detected as a similar route, there may be a problem in which information regarding the power consumption that is excessively lower than the power consumption that is necessary when traveling from the departure point $P_O$ to the destination point $P_D$ will be provided.

The operation then proceeds to step S432, and the historical statistics processing unit 27 determines whether or not the number of detected similar routes is equal to or greater than the first predetermined value α1 as a result of performing another search using the expanded departure point range $R_O'$ and departure point range $R_D'$ in step S431 described above. Then, if the historical statistics processing unit 27 determines that the number of detected similar routes is equal to or greater than the first predetermined value α1 (step S432=Yes), the operation proceeds to step S405 in FIG. 6. On the other hand, if the historical statistics processing unit 27 determines that the number of detected similar routes is still less than the first predetermined value α1 (step S432=No), the operation proceeds to step S433.

Figure 12:
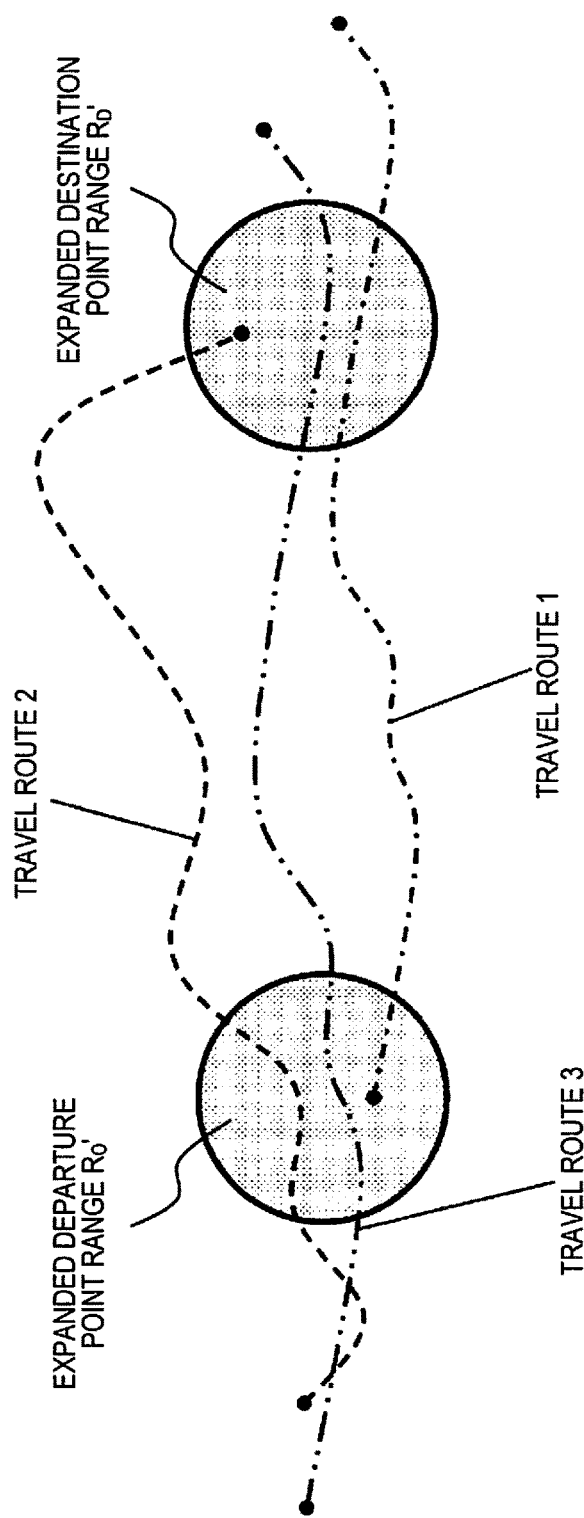
FIG. 12 is a view showing a method for searching for transit routes.

Then, if a determination is made in step S432 that the number of detected similar routes is still less than the first predetermined value α1, the operation proceeds to step S433; in step S433, the historical statistics processing unit 27 executes another search by including a transit route, which is a route that at least passes through the expanded departure point range $R_O'$ and the departure point range $R_D'$, within the search range. Here, FIG. 12 is a view showing a method for searching transit routes. A transit route is a route that at least passes through the expanded departure point range $R_O'$ and the destination point range $R_D'$, as illustrated in FIG. 12. An example is a route in which the travel start point is within the expanded departure point range $R_O'$; however, the travel end point is not within the expanded destination point range $R_D'$, and only passes through the destination point range $R_D'$, as in "transit route 1" illustrated in FIG. 12. Another example is a route in which the travel end point is within the expanded destination point range $R_D'$; however the travel start point is not within the expanded departure point range $R_O'$, and only passes through the departure point range $R_O'$, as in "transit route 2" illustrated in FIG. 12. Another example is a route in which neither the travel start point nor the travel end point is within the expanded departure point range $R_O'$ and the expanded destination point range $R_D'$, and they only pass through the departure point range $R_O'$ and destination point range $R_D'$, as in "transit route 3" illustrated in FIG. 12.

When this type of transit route (that is, a route that at least passes through the expanded departure point range $R_O'$ and the destination point range $R_D'$) is detected, the historical statistics processing unit 27 extracts this as a similar route. In the description above, an example was explained in which a transit route is searched for using an expanded departure point range $R_O'$ and a destination point range $R_D'$; however, this may be configured so that a transit route is searched for using the departure point range $R_O$ and the destination point range $R_D$ before expansion.

The operation then proceeds to step S434, and the historical statistics processing unit 27 determines whether or not the number of detected similar routes is equal to or greater than the first predetermined value $\alpha 1$ as a result of performing another search after expanding the search target to the transit route in step S433 described above. When the historical statistics processing unit 27 determines that the number of detected similar routes is equal to or greater than the first predetermined value $\alpha 1$ (step S434=Yes), the operation proceeds to step S405. On the other hand, if the historical statistics processing unit 27 determines that the number of detected similar routes is still less than the first predetermined value $\alpha 1$ (step S434=No), the operation proceeds to step S435.

Then, if a determination is made in step S434 that the number of detected similar routes is still less than the first predetermined value $\alpha 1$, the operation proceeds to step S435; in step S435, the historical statistics processing unit 27 determines whether or not the operation to expand the departure point range $R_O$ and the destination point range $R_D$ in step S431 described above has been performed a preset, predetermined number of times. As a result, if a determination is made that the operation to expand the departure point range $R_O$ and the destination point range $R_D$ has been performed a predetermined number of times (step S435=Yes), the historical statistics processing unit 27 determines that, if the departure point range $R_O$ and the destination point range $R_D$ are expanded any further, the accuracy of the detected similar routes will decrease; then, the operation proceeds to step S405 in FIG. 6. On the other hand, if the historical statistics processing unit 27 determines that the number of times that the operation to expand the departure point range $R_O$ and the destination point range $R_D$ was performed is less than the predetermined number of times (step S435=No), the operation returns to step S431; in step S431, the expanded departure point range $R_O'$ and the destination point range $R_D'$ are expanded by another step, and a search is executed again.

Until a determination is made that the number of detected similar routes has become equal to or greater than the first predetermined value $\alpha 1$ in the above-described step S432 or S434, or until a determination is made that the operation to expand the departure point range $R_O$ and the destination point range $R_D$ has been performed a predetermined number of times in the above-described step S435, the historical statistics processing unit 27 repeatedly performs the operations of steps S431-S435 described above.

Additionally, when a determination is made by assessing (searching) whether the number of detected similar routes is equal to or greater than the first predetermined value $\alpha 1$ in step S404, S432, or S434 described above, or when a determination is made that the operation to expand the departure point range $R_O$ and the destination point range $R_D$ has been performed a predetermined number of times in the above-described step S435, the operation proceeds to step S405 in FIG. 6. In step S405, a determination is made regarding whether or not the number of detected similar routes is equal to or less than a preset second predetermined value $\alpha 2$ after a search (searching) in step S403, S431, or S433 described above. Then, if the historical statistics processing unit 27 determines that the number of detected similar routes is equal to or greater than the second predetermined value $\alpha 2$ (step S405=Yes), the operation proceeds to step S406. On the other hand, if the historical statistics processing unit 27 determines that the number of detected similar routes is greater than the second predetermined value $\alpha 2$ (step S405=No), the operation proceeds to step S441 illustrated in FIG. 8. The second predetermined value $\alpha 2$ may be set to be a number at which the driver will not be imparted with any annoyance when making a plurality of similar routes the presentation routes and providing information regarding the presentation routes to the driver, as described below. Additionally, the value may be set to a statistical number (a statistically suitable number) for averaging and providing a power consumption amount, etc.

Figure 8:
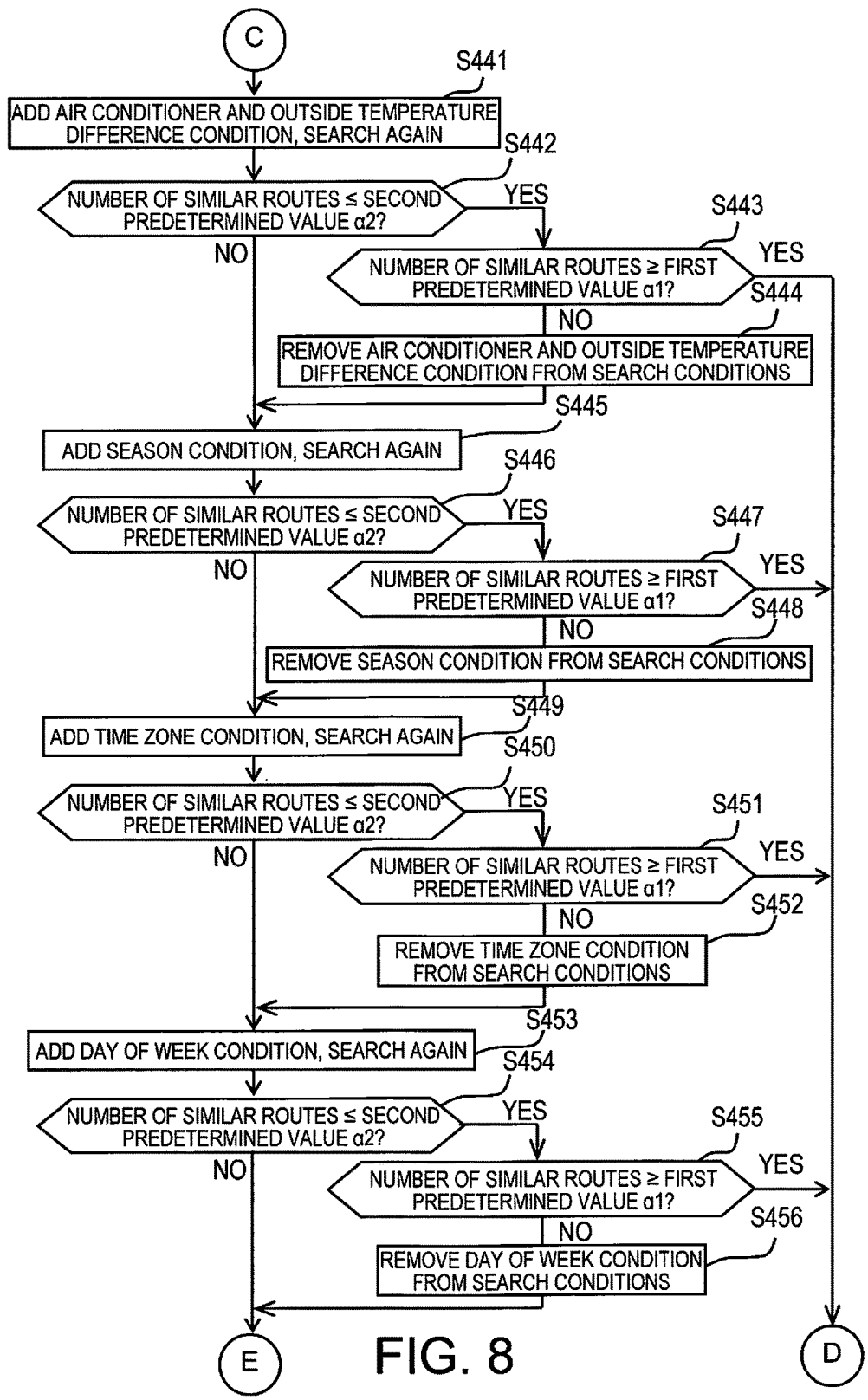
FIG. 8 is a flowchart (part 3) representing the driving history statistical processing step.
Figure 9:
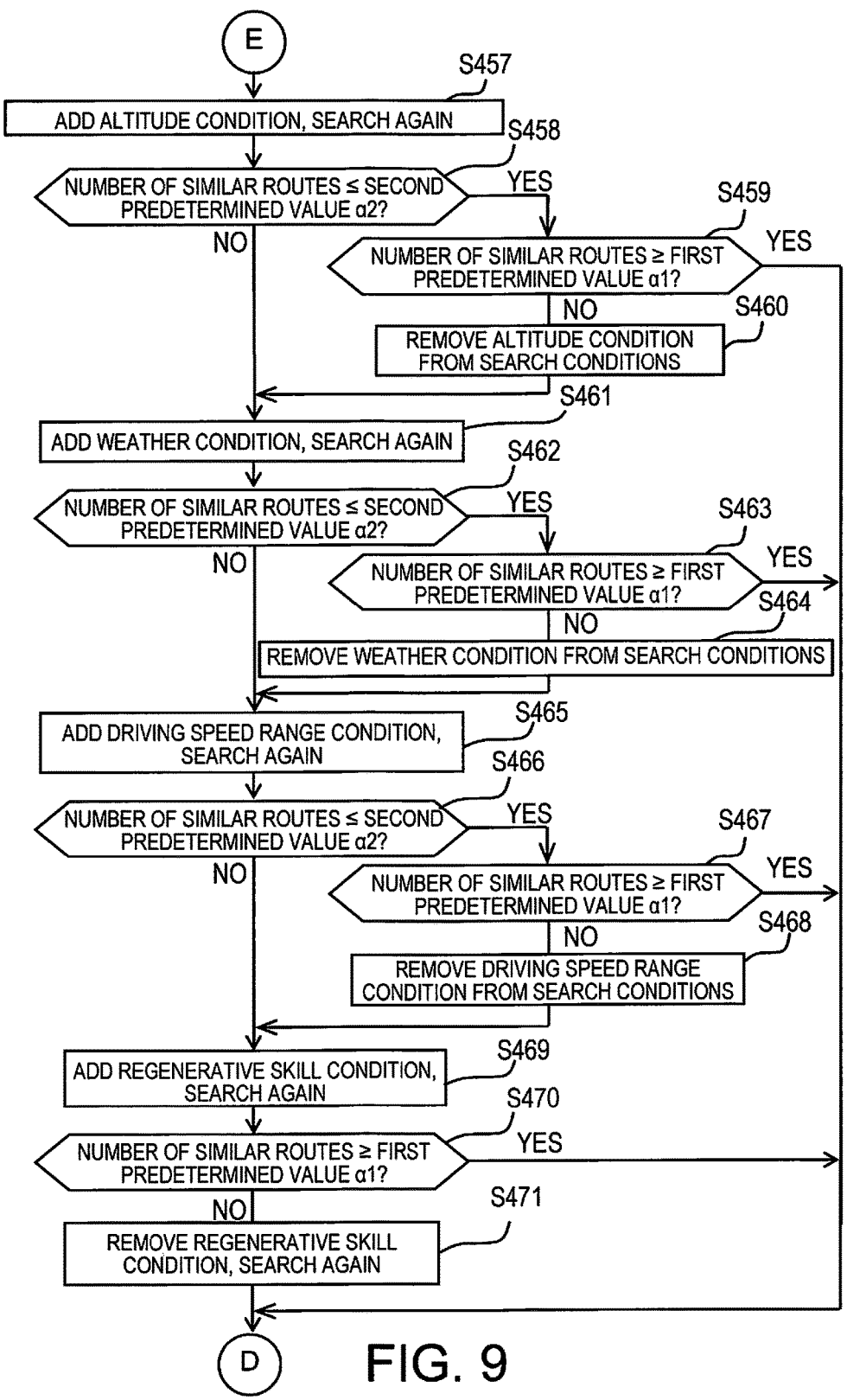
FIG. 9 is a flowchart (part 4) representing the driving history statistical processing step.

Then, if a determination is made in step S405 that the number of detected similar routes is greater than the second predetermined value $\alpha 2$, the operation proceeds to step S441 illustrated in FIG. 8; in step S441, the historical statistics processing unit 27 performs another search for a similar route after having added the similar air conditioner and outside temperature difference, which is the difference between the set temperature of the air conditioner and the outside temperature, as another search condition. That is, the historical statistics processing unit 27 first acquires the condition of the air conditioner and outside temperature difference of the host vehicle A, which is included in the destination point input information, which is received from the source terminal device 2 along with the presentation route search request (that is, the condition of the air conditioner and outside temperature difference of the host vehicle A of the driver who possesses the source terminal device 2). An example of a source terminal device 2 may be, for example, a terminal device 2 of the transmission source of the presentation route search request, which acted as a trigger to start this history statistical processing step. Next, from the first piece of driving history information (route) accumulated by the driving history accumulation unit 26, the historical statistics processing unit 27 searches for a route having a travel start point and a travel end point within the set departure point range $R_O$ and destination point range $R_D$, as well as in which the air conditioner and outside temperature difference is similar to the air conditioner and outside temperature difference condition of the host vehicle A (the host vehicle A of the driver of the source terminal device 2) and detects the searched route as a similar route.

The operation then proceeds to step S442, and the historical statistics processing unit 27 determines whether or not the number of detected similar routes is equal to or less than the second predetermined value $\alpha 2$ as a result of performing another search after having added a similar air conditioner and outside temperature difference condition as another search condition in step S441 described above. Then, if the historical statistics processing unit 27 determines that the number of detected similar routes is equal to or less than the second predetermined value $\alpha 2$ (step S442=Yes), the operation proceeds to step S443. On the other hand, if the historical statistics processing unit 27 determines that the number of detected similar routes is still greater than the second predetermined value $\alpha 2$ (step S442=No), the operation proceeds to step S445. The operation shall proceed to step S445 even if the air conditioner and outside temperature difference condition of the host vehicle A is not included in the destination point input information, which is received along with the presentation route search request.

Then, if a determination is made that the number of detected similar routes is equal to or less than the second predetermined value $\alpha 2$ in step S442, the operation proceeds to step S443; in step S443, a determination is made whether or not the number of detected similar routes is equal to or greater than the first predetermined value $\alpha 1$. When the historical statistics processing unit 27 determines that the number of detected similar routes is equal to or greater than the first predetermined value $\alpha 1$ (step S443=Yes), the operation proceeds to step S406 in FIG. 6. On the other hand, if the historical statistics processing unit 27 determines that the number of detected similar routes is less than the first predetermined value $\alpha 1$ (step S443=No), the operation proceeds to step S444; in step S444, the historical statistics processing unit 27 determines that the number of detected similar routes has decreased too much by added the similar air conditioner and outside temperature difference condition as a search condition, then, an operation to remove similar air conditioner and outside temperature difference conditions from the conditions for searching, is performed.

The operation then proceeds to step S445, and the historical statistics processing unit 27 performs another search for similar routes after having added the similar season conditions as a search condition. That is, the historical statistics processing unit 27 first acquires the season condition, which is included in the destination point input information that is received from the source terminal device 2, along with the presentation route search request. Next, from the first piece of driving history information (route) accumulated by the driving history accumulation unit 26, the historical statistics processing unit 27 searches for a route having a travel start point and a travel end point within the set departure point range $R_O$ and destination point range $R_D$, as well as in which the season condition is similar to the season condition of the host vehicle A (the host vehicle A of the driver of the source terminal device 2), and the searched route is extracted as a similar route. At this time, if an operation to remove similar air conditioner and outside temperature differences from the conditions for searching was performed in step S444 described above, the air conditioner and outside temperature difference condition is not added to the search condition when performing another search for similar routes; if an operation to remove similar air conditioner and outside temperature differences from the conditions for searching was not performed, the similar air conditioner and outside temperature differences is added to the search conditions, along with the weather condition. That is, in this case, from the first piece of driving history information (route) accumulated by the driving history accumulation unit 26, the historical statistics processing unit 27 searches for a route having a travel start point and a travel end point within the set departure point range $R_O$ and destination point range $R_D$, as well as in which the air conditioner and outside temperature difference and the season condition are similar to the air conditioner and outside temperature difference condition and the season condition of the host vehicle A (the host vehicle A of the driver of the source terminal device 2), and the searched route is detected as a similar route.

Next, in steps S446-S448, in the same way as in steps S442-S444 described above, a determination regarding whether or not the number of detected similar routes has become equal to or less than the second predetermined value $\alpha 2$ (step S446), a determination regarding whether the number of detected similar routes is equal to or greater than the first predetermined value $\alpha 1$ (step S447), and an operation to remove a similar season condition from the searching conditions (step S448) is performed.

The operation then proceeds to step S449, and the historical statistics processing unit 27 performs another search for similar routes after having added the similar travel time zone conditions (that is, the travel time condition is similar to the host vehicle A of the driver of the source terminal device 2) as a search condition. Next, in subsequent steps S450-S452, in the same way as in steps S442-S444 described above, a determination regarding whether or not the number of detected similar routes has become equal to or less than the second predetermined value $\alpha 2$ (step S450), a determination regarding whether the number of detected similar routes is equal to or greater than the first predetermined value $\alpha 1$ (step S451), and an operation to remove a similar travel time zone condition from the searching conditions (step S452) is performed.

The operation then proceeds to step S453, and the historical statistics processing unit 27 performs another search for similar routes after having added the similar day of week conditions (that is, the day of week condition is similar to the host vehicle A of the driver of the source terminal device 2) as a search condition. Whether or not the day of week condition is similar can be determined based on whether the day is a weekday or a holiday by, for example, assuming that Monday through Friday are weekdays and Saturday and Sunday are holidays. Next, in steps S454-S456, in the same way as in steps S442-S444 described above, a determination regarding whether or not the number of detected similar routes has become equal to or less than the second predetermined value $\alpha 2$ (step S454), a determination regarding whether the number of detected similar routes is equal to or greater than the first predetermined value $\alpha 1$ (step S455), and an operation to remove a similar day of week condition from the searching conditions (step S456) is performed.

The operation then proceeds to step S457, and the historical statistics processing unit 27 performs another search for similar routes after having added the similar driving altitude conditions (that is, the driving altitude condition is similar to the host vehicle A of the driver of the source terminal device 2) as a search condition. Whether or not the driving altitude condition is similar may be determined by comparing the altitudes of the departure point $P_O$ and the destination point $P_D$, which are included in the destination point input information that is received from the source terminal device 2, along with the presentation route search request, and the altitudes of the travel start point and the travel end point of each route, which are included in the first piece of driving history information (route) that is accumulated by the driving history accumulation unit 26. Next, in steps S458-S460, in the same way as in steps S442-S444 described above, a determination regarding whether or not the number of detected similar routes has become equal to or less than the second predetermined value α2 (step S458), a determination regarding whether the number of detected similar routes is equal to or greater than the first predetermined value α1 (step S459), and an operation to remove a similar driving altitude condition from the searching conditions (step S460) is performed.

The operation then proceeds to step S461, and the historical statistics processing unit 27 performs another search for similar routes after having added the similar weather conditions (that is, the weather condition is similar to that of the host vehicle A of the driver of the source terminal device 2) as a search condition. Next, in steps S462-S464, in the same way as in steps S442-S444 described above, a determination regarding whether or not the number of detected similar routes has become equal to or less than the second predetermined value α2 (step S462), a determination regarding whether the number of detected similar routes is equal to or greater than the first predetermined value α1 (step S463), and an operation to remove a similar weather condition from the searching conditions (step S464) is performed.

The operation then proceeds to step S465, and the historical statistics processing unit 27 performs another search for similar routes after having added the similar driving speed range conditions (that is, the driving speed range condition is similar to that of the host vehicle A of the driver of the source terminal device 2) as a search condition. Next, in subsequent steps S466-S468, in the same way as in steps S442-S444 described above, a determination regarding whether or not the number of detected similar routes has become equal to or less than the second predetermined value α2 (step S466), a determination regarding whether the number of detected similar routes is equal to or greater than the first predetermined value α1 (step S467), and an operation to remove a similar driving speed range condition from the searching conditions (step S468) is performed.

The operation then proceeds to step S469, and the historical statistics processing unit 27 performs another search for similar routes after having added the similar regenerative skill conditions (that is, the regenerative skill condition is similar to that of the driver of the source terminal device 2) as a search condition. The historical statistics processing unit 27 is able to acquire the regenerative skill information of the driver of the host vehicle A by acquiring the driver ID information, which is included in the destination point input information that is received from the source terminal device 2, and by referring to the first piece of driving history information that is accumulated by the driving history accumulation unit 26. Next, in step S470, in the same way as in step S443 described above, a determination regarding whether or not the number of detected similar routes is equal to or greater than the first predetermined value α1 is executed; if the number of detected similar routes is equal to or greater than the first predetermined value α1 (step S470=Yes), the operation proceeds to step S406 in FIG. 6. On the other hand, if the number of detected similar routes is less than the first predetermined value α1 (step S470=No), a similar regenerative skill condition is removed from the search conditions, another search for similar routes is performed, and the operation proceeds to step S406 in FIG. 6.

The operation then proceeds to step S406 in FIG. 6; in step S406, the historical statistics processing unit 27 determines the similar routes that are detected as a result of performing a search (searching) in the above-described steps S403, S431, S433, S441, S445, S449, S453, S457, S461, S465, S469, and S471 as the presentation routes.

The operation then proceeds to step S407, and the historical statistics processing unit 27 determines whether or not a presentation route has been determined in the above-described step S406. That is, the historical statistics processing unit 27 determines whether or not a similar route was detected in the above-described steps S403, S431, S433, S441, S445, S449, S453, S457, S461, S465, S469, or S471. Then, if the historical statistics processing unit 27 determines that a presentation route has been identified (step S407=Yes), the operation proceeds to step S408. On the other hand, if the historical statistics processing unit 27 determines that a presentation route has not been identified (step S407=No), the operation proceeds to step S410.

If a determination is made that a presentation route has been identified, the operation proceeds to step S408; in step S408, the historical statistics processing unit 27 extracts the charging hubs that were traversed when driving along the presentation routes determined in the above-described step S406 from the second piece of driving history information (charging hubs) accumulated by the driving history accumulation unit 26. For example, the historical statistics processing unit 27 searches for the first piece of driving history information that includes the presentation routes determined in the above-described step S406 within the first piece of driving history information that is accumulated by the driving history accumulation unit 26. Next, the historical statistics processing unit 27 extracts the charging hubs from the second piece of driving history information that is associated with the searched for first piece of driving history information within the second piece of driving history information (charging hubs) that is accumulated by the driving history accumulation unit 26.

The operation then proceeds to step S409, and the historical statistics processing unit 27 extracts the power that is consumed when driving along the presentation routes determined in the above-described step S406 within the first piece of driving history information (the power consumption information) that is accumulated by the driving history accumulation unit 26, after which the operation proceeds to step S412. For example, the historical statistics processing unit 27 extracts the power consumption from the first piece of driving history information, which includes the presentation routes extracted in the above-described step S406. At this time, if a plurality of the presentation routes determined in step S406 described above exists, the historical statistics processing unit 27 calculates the average value of the power that is consumed when driving along the presentation routes and extracts this as the average power consumption. If the presentation route is the transit route mentioned above (refer to FIG. 12), the position closest to the departure point $P_O$ is set as the travel start point, the position closest to the destination point $P_D$ is set as the travel end point, and the power that is consumed when driving between the preset travel start point and the travel end point shall be extracted.

On the other hand, if a determination is made in step S407 that a presentation route could not be determined, the operation proceeds to step S410; in step S410, the historical statistics processing unit 27 calculates the power that is consumed when driving along the planned route that is searched for in step S401 described above (hereinafter also referred to as the theoretical power consumption), based on the theoretical performance of the host vehicle A. Specifically, the historical statistics processing unit 27 makes the result of multiplying the power consumption per a predetermined unit of distance by the total length of the planned route the theoretical power consumption.

The operation then proceeds to step S411, and the historical statistics processing unit 27 extracts the position of a charging facility C that exists in the vicinity of the planned route that is searched for in the above-described step S401, based on the map information that is stored by the map information storage unit 25, after which the operation proceeds to step S412. The charging facility C that exists in the vicinity of the planned route may be a charging facility C that exists along the planned route or a charging facility C that is within a set distance (for example, 20 m) from the planned route, etc.

Next, in step S412, the historical statistics processing unit 27 executes a charging hub extraction operation based on the battery level acquired in the above-described step S402. In the charging hub extraction operation, the historical statistics processing unit 27 extracts the charging hubs that are transmitted (provided) to the source terminal device 2 from the charging hubs acquired in step S408 or S411 described above. An example of a source terminal device 2 may be, for example, the terminal device 2 of the transmission source of the presentation route search request, which acted as a trigger to start this history statistical processing step. Additionally, in the charging hub extraction operation, the possibility that the vehicle A cannot reach the destination point is determined; when a determination is made that there is a possibility that the vehicle cannot reach the destination, an unreachable warning, which gives a warning to that effect, is issued. The details of the charging hub extraction operation will be described below.

The operation then proceeds to step S413, and the historical statistics processing unit 27 executes a power consumption correction operation, based on the power consumption trends of the driver of the vehicle A. In the power consumption correction operation, the historical statistics processing unit 27 calculates the power that is consumed when driving along the presentation route (the similar route) by referencing the first piece of driving history information of the driver that is specified by the driver ID, which is included in the presentation route search request, from the first piece of driving history information that is accumulated by the driving history accumulation unit 26. The historical statistics processing unit 27 then corrects the power consumption extracted in step S409 or S410 described above, based on the calculated power consumption. The details of the power consumption correction operation will be described below.

The operation then proceeds to step S414, and the historical statistics processing unit 27 transmits (provides) to the source terminal device 2 the presentation route (the similar route) extracted in step S406 described above, the charging hubs extracted in step S412 described above, and information regarding the power consumption that was corrected in step S413 described above, after which the driving history statistical processing step ends. If a presentation route could not be extracted in step S406 described above, the historical statistics processing unit 27 transmits information regarding the planned route searched for in the above-described step S401, the charging hubs extracted in the above-described step S412, and the power consumption (the theoretical power consumption) calculated in the above-described step S411. If an unreachable warning is issued in the above-described step S412, the historical statistics processing unit 27 also transmits (provides) a control command for displaying the unreachable warning to the source terminal device 2.

In the present embodiment, an example was described in which information regarding the charging hubs extracted in the above-described step S412 and the power consumption that is corrected in the above-described step S413 is transmitted (provided) to the source terminal device 2; however, another configuration may also be employed. For example, the configuration may be to transmit (provide) information regarding the charging hubs acquired in step S408 or S411 described above and the power consumption before correction in the above-described step S413 to the source terminal device 2.

Charging Hub Extraction Operation

Figure 13:
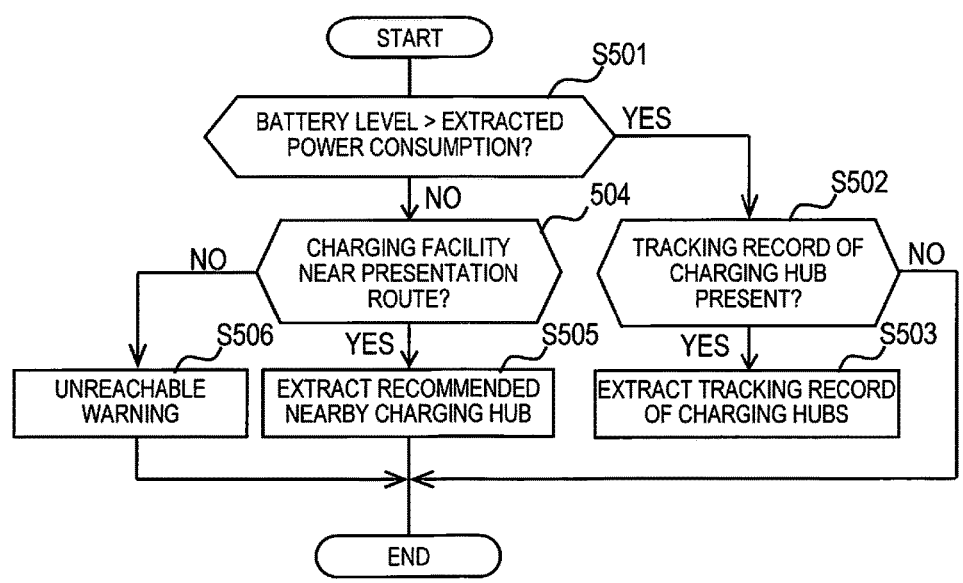
FIG. 13 is a flowchart representing the charging hub extraction operation.

Next, the charging hub extraction operation that is executed by the historical statistics processing unit 27 will be described. When the operation proceeds to step S412 in the above-described driving history statistical processing step, the historical statistics processing unit 27 executes a charging hub extraction operation. FIG. 13 is a flowchart representing the charging hub extraction operation.

First, in step S501, the historical statistics processing unit 27 determines whether or not the battery level acquired in the above-described step S402 is greater than the power consumption extracted in step S409 or S410 described above (hereinafter also referred to as the extracted power consumption), as illustrated in FIG. 13. Then, if the historical statistics processing unit 27 determines that the battery level is greater than the extracted power consumption (step S501=Yes), the operation proceeds to step S502. On the other hand, if the historical statistics processing unit 27 determines that the battery level is equal to or less than the extracted power consumption (step S501=No), the operation proceeds to step S505.

When a determination is made that the battery level is greater than the extracted power consumption in step S501, the operation proceeds to step S502; in step S502, the historical statistics processing unit 27 determines whether or not there is a tracking record of a charging hub within the charging hubs acquired in steps S408 or S411 described above by referencing the second piece of driving history information (charging hubs) accumulated by the driving history accumulation unit 26. A tracking record of a charging hub may be a location of a charging facility C at which at least one of a plurality of vehicles A has actually performed charging. Then, if the historical statistics processing unit 27 determines that there is a tracking record of a charging hub (step S502=Yes), the operation proceeds to step S503. On the other hand, if the historical statistics processing unit 27 determines that there is no tracking record of a charging hub (step S502=No), a charging hub is not extracted, and the charging hub extraction operation ends. The historical statistics processing unit 27 thereby does not transmit (provide) information regarding tracking record of charging hubs to the source terminal device 2 when the battery level of the battery 14 for running the vehicle is sufficient and there is no tracking record of a charging hub among the charging hubs acquired in step S408 or S411 described above. Since, conceivably, a tracking record of a charging hub is a private-use charging facility of a particular individual or a corporation, preferentially, facilities that are without a doubt public charging facilities are determined through statistical processing. For example, a method in which the configuration has a separate database for public charging facilities and for those with a track record in the same locations as those from which these data have been extracted may be conceived, or a method for extracting the charging facilities having a charging track record in which plural vehicles (for example, equal to or greater than five) owned by different parties/entities (including corporations and individuals) have charged at the same location may be conceived. Additionally, making selections so that the charging facilities that can actually be utilized during the estimated arrival time zone at the hubs are preferentially traversed is possible by considering the available time zones when utilizing these data.

On the other hand, when a determination is made that there is a tracking record of a charging hub, the operation proceeds to step S503; in step S503, the historical statistics processing unit 27 extracts the tracking record of charging hubs from the charging hubs acquired in step S408 or S411 described above by referencing the second piece of driving history information (charging hubs) accumulated by the driving history accumulation unit 26, after which the charging hub extraction operation ends. The historical statistics processing unit 27 thereby only transmits (provides) information regarding the tracking record of charging hubs to the source terminal device 2 when the battery level of the battery 14 for running the vehicle is sufficient and there is a tracking record of a charging hub among the charging hubs acquired in step S408 or S411 described above.

When a determination is made that the battery level is equal to or less than the extracted power consumption in the above-described step S501, the operation proceeds to step S504; in step S504, the historical statistics processing unit 27 determines whether or not a charging facility C exists in the vicinity of the presentation route (the similar route) determined in step S406 described above, based on the map information stored by the map information storage unit 25. The charging facility C that exists in the vicinity of the presentation route may be a charging facility C that exists along the presentation route or a charging facility C that is within a set distance (for example, 20 m) from the presentation route, etc. If the historical statistics processing unit 27 determines that a charging facility C exists in the vicinity of the presentation route (step S504=Yes), the operation proceeds to step S505. On the other hand, if the historical statistics processing unit 27 determines that a charging facility C does not exist in the vicinity of the presentation route (step S504=No), the operation proceeds to step S506.

If a presentation route could not be determined in step S406 described above, the historical statistics processing unit 27 determines whether or not a charging facility C exists in the vicinity of the planned route searched for in the above-described step S401, based on the map information that is stored by the map information storage unit 25. If the historical statistics processing unit 27 determines that a charging facility C exists in the vicinity of the planned route (step S504=Yes), the operation proceeds to step S505. On the other hand, if the historical statistics processing unit 27 determines that a charging facility C does not exist in the vicinity of the planned route (step S504=No), the operation proceeds to step S506.

When a determination is made that a charging facility C exists in the vicinity of the presentation route in step S504, the operation proceeds to step S505; in step S505, the historical statistics processing unit 27 extracts the position of the charging facility C that exists in the vicinity of the presentation route (the similar route) (hereinafter also referred to as the recommended nearby charging hub), based on the map information that is stored by the map information storage unit 25, after which the charging hub extraction operation ends. If a presentation route could not be extracted in step S406 described above, the historical statistics processing unit 27 extracts recommended nearby charging hubs that are present in the vicinity of the planned route, based on the map information that is stored by the map information storage unit 25. The historical statistics processing unit 27 thereby only transmits (provides) to the source terminal device 2 information regarding the recommended nearby charging hubs when the battery level of the battery 14 for running the vehicle is insufficient and there is a recommended nearby charging hub present.

On the other hand, when a determination is made that a charging facility C does not exist in the vicinity of the presentation route in step S504, the operation proceeds to step S506; in step S506, the historical statistics processing unit 27 issues an unreachable warning, after which the charging hub extraction operation ends. The historical statistics processing unit 27 thereby does not transmit (provide) to the source terminal device 2 information regarding the recommended nearby charging hubs (the charging hubs) when the battery level of the battery 14 for running the vehicle is insufficient and a recommended nearby charging hub is not present.

Power Consumption Correction Operation

Figure 14:
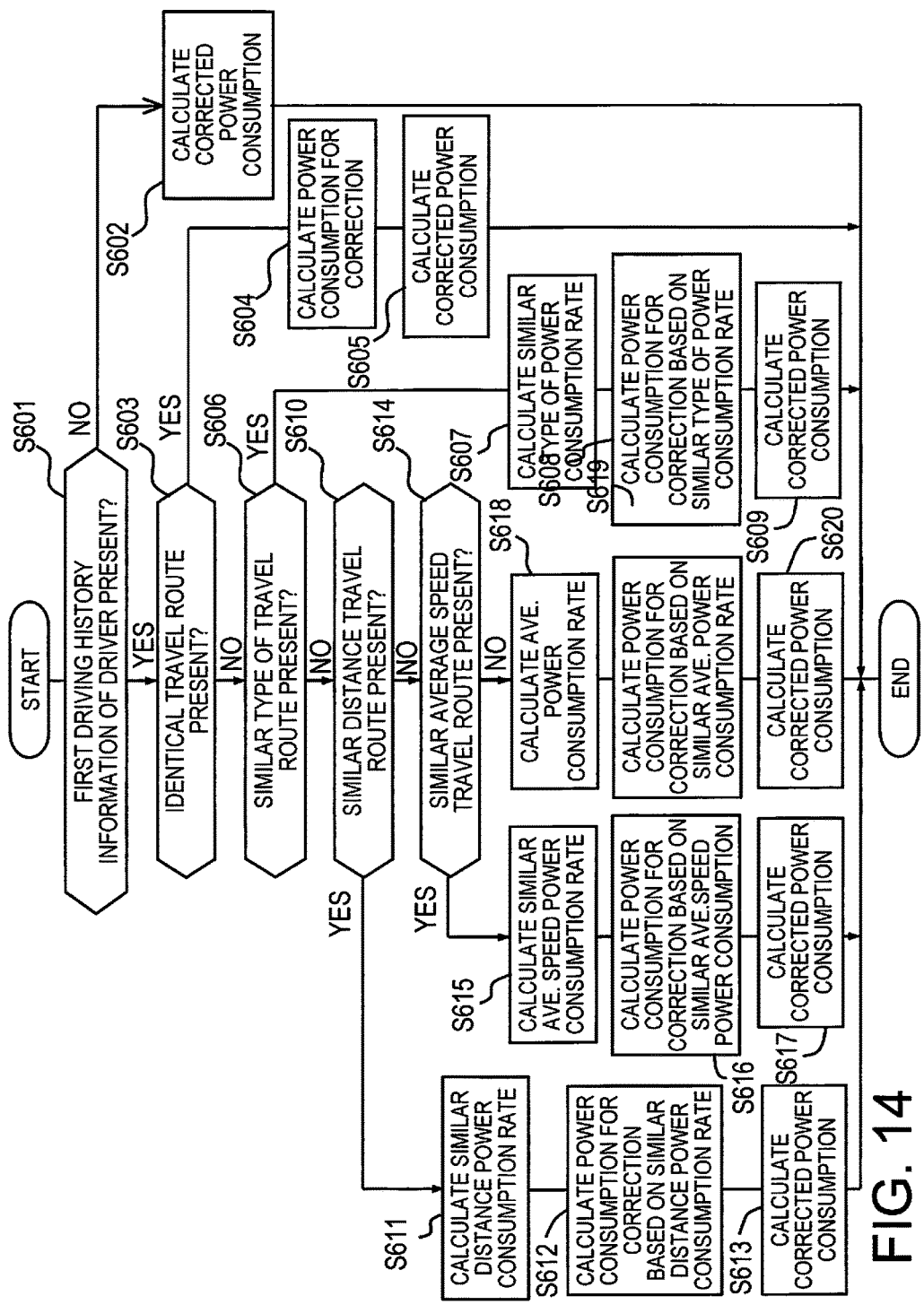
FIG. 14 is a flowchart representing the power consumption correction operation.

Next, the power consumption correction operation that is executed by the historical statistics processing unit 27 will be described. When the operation proceeds to step S413 in the above-described driving history statistical processing step, the historical statistics processing unit 27 executes a power consumption correction operation. FIG. 14 is a flowchart representing the power consumption correction operation.

First, in step S601, the historical statistics processing unit 27 acquires the driver ID (information for identifying the driver) from the received presentation route search request, as illustrated in FIG. 14. Next, the historical statistics processing unit 27 determines whether or not there is a first piece of driving history information that includes a driver ID that is identical to the acquired driver ID (hereinafter also referred to as the source driving history information) within the first piece of driving history information that is accumulated by the driving history accumulation unit 26. Then, if the historical statistics processing unit 27 determines that there is source driving history information (step S601=Yes), the operation proceeds to step S603. On the other hand, if the historical statistics processing unit 27 determines that there is no source driving history information (step S601=No), the operation proceeds to step S602.

When a determination is made that there is source driving history information in step S601, the operation proceeds to step S602; in step S602, the historical statistics processing unit 27 sets the power consumption calculated in step S409 or S410 described above as the corrected power consumption as is (hereinafter also referred to as the corrected power consumption), and the power consumption correction operation ends. The historical statistics processing unit 27 thereby transmits (provides) to the source terminal device 2 information regarding the power consumption calculated in step S409 or S410 described above as is when source driving history information does not exist within the first piece of driving history information that is accumulated by the driving history accumulation unit 26.

On the other hand, if a determination is made that source driving history information does not exist in step S601, the operation proceeds to step S603; in step S603, the historical statistics processing unit 27 determines whether or not there is a route that is identical to the presentation route that is determined in the above-described step S407 within the source driving history information (route) that is accumulated by the driving history accumulation unit 26 (hereinafter also referred to as the identical route). Then, if the historical statistics processing unit 27 determines that there is an identical route (step S603=Yes), the operation proceeds to step S604. On the other hand, if the historical statistics processing unit 27 determines that there is no identical route (step S603=No), the operation proceeds to step S606. An identical route may be any route that can be determined to be identical to the presentation route that is determined in the above-described step S407; there may be discrepancies as long as they can be determined to be within the margin of error.

When a determination is made that there is an identical route in step S603, the operation proceeds to step S604; in step S604, the historical statistics processing unit 27 extracts the power that was consumed when driving along the identical route from the source driving history information that is accumulated by the driving history accumulation unit 26. Next, the historical statistics processing unit 27 sets the extracted power consumption as the power consumption for correction.

The operation then proceeds to step S605, and the historical statistics processing unit 27 corrects the power consumption that is calculated in step S409 or S410 described above, based on the power consumption for correction calculated in the above-described step S604. Examples of a method for correcting the power consumption include a method for replacing the power consumption with the power consumption for correction, a method for calculating the average value of the power consumption and the power consumption for correction, and a method for using the difference c between the power consumption b and the power consumption for correction a and expressing this as a+c. Next, the historical statistics processing unit 27 sets the power consumption that has been corrected as the corrected power consumption, after which the power consumption correction operation ends. The historical statistics processing unit 27 thereby makes a correction using the power that was consumed when driving along the identical route and transmits (provides) the corrected power consumption to the source terminal device 2 when there is an identical route within the source driving history information that is accumulated by the driving history accumulation unit 26.

On the other hand, when a determination is made that there is no identical route in step S603 described above, the operation proceeds to step S606; in step S606, the historical statistics processing unit 27 determines whether or not there is a similar type of route within the source driving history information (route) that is accumulated by the driving history accumulation unit 26. A similar type of route may be, for example, a route that has an identical or similar road type as the presentation route (the similar route) that is extracted in step S406 described above. If a presentation route could not be extracted in the step S406 described above, the planned route that is searched for in the above-described step S401 is set as a similar type of route. Then, if the historical statistics processing unit 27 determines that there is a similar type of route (step S606=Yes), the operation proceeds to step S607. On the other hand, if the historical statistics processing unit 27 determines that there is no similar type of route (step S606=No), the operation proceeds to step S610.

When a determination is made that there is a similar type of route in step S606, the operation proceeds to step S607; in step S607, the historical statistics processing unit 27 calculates the power consumption per unit of distance of the similar type of route (hereinafter also referred to as the similar type power consumption rate) by referencing the source driving history information that is accumulated by the driving history accumulation unit 26.

The operation then proceeds to step S608, and the historical statistics processing unit 27 multiplies the similar type power consumption rate calculated in the step S607 described above by the total length of the planned route. Then, the historical statistics processing unit 27 sets the product as the power consumption for correction.

The operation then proceeds to step S609, and the historical statistics processing unit 27 corrects the power consumption that is calculated in step S409 or S410 described above, based on the power consumption for correction calculated in the above-described step S608. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar type power consumption rate and transmits (provides) the corrected power consumption to the source terminal device 2 when there is a similar type of route within the source driving history information that is accumulated by the driving history accumulation unit 26.

On the other hand, when a determination is made that there is no similar type of route in step S606 described above, the operation proceeds to step S610; in step S610, the historical statistics processing unit 27 determines whether or not there is a similar distance route within the source driving history information (route) that is accumulated by the driving history accumulation unit 26. A similar distance route may be, for example, a route that has an identical or similar total length as the presentation route (the similar route) that is determined in step S406 described above. If a presentation route could not be determined in the step S406 described above, the planned route that is searched for in the above-described step S401 is set as a similar distance route. For example, the historical statistics processing unit 27 determines whether or not there is a route with a difference in the total length, when compared to the presentation route, that is less than a predetermined value (for example, ±100 m) within the source driving history information (route) that is accumulated by the driving history accumulation unit 26. Then, if the historical statistics processing unit 27 determines that there is a similar distance route (step S610=Yes), the operation proceeds to step S611. On the other hand, if the historical statistics processing unit 27 determines that there is no similar distance route (step S610=No), the operation proceeds to step S614.

When a determination is made that there is a similar distance route in step S610, the operation proceeds to step S611; in step S611, the historical statistics processing unit 27 calculates the power consumption per unit of distance of the similar distance route (hereinafter also referred to as the similar distance power consumption rate) by referencing the source driving history information that is accumulated by the driving history accumulation unit 26.

The operation then proceeds to step S612, and the historical statistics processing unit 27 multiplies the similar distance power consumption rate calculated in the step S611 described above by the total length of the planned route. Then, the historical statistics processing unit 27 sets the product as the power consumption for correction.

The operation then proceeds to step S613, and the historical statistics processing unit 27 corrects the power consumption that is calculated in step S409 or S410 described above, based on the power consumption for correction calculated in the above-described step S612. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar distance power consumption rate and transmits (provides) the corrected power consumption to the source terminal device 2 when there is a similar distance route within the source driving history information that is accumulated by the driving history accumulation unit 26.

On the other hand, when a determination is made that there is no similar distance route in step S610 described above, the operation proceeds to step S614; in step S614, the historical statistics processing unit 27 determines whether or not there is a similar average speed route within the source driving history information (route) that is accumulated by the driving history accumulation unit 26. A similar average speed route may be, for example, a route that has an identical or similar average speed as the presentation route (the similar route) that is determined in step S406 described above. If a presentation route could not be determined in the step S406 described above, the planned route that is searched for in the above-described step S401 is set as a similar average speed route. For example, the historical statistics processing unit 27 determines whether or not there is a route with a difference in the average speed, when compared to the presentation route, that is less than a predetermined value (for example, ±5 km/h) within the source driving history information (route) that is accumulated by the driving history accumulation unit 26. Then, if the historical statistics processing unit 27 determines that there is a similar average speed route (step S614=Yes), the operation proceeds to step S615. On the other hand, if the historical statistics processing unit 27 determines that there is no similar average speed route (step S614=No), the operation proceeds to step S618.

When a determination is made that there is a similar average speed route in step S614, the operation proceeds to step S615; in step S615, the historical statistics processing unit 27 calculates the power consumption per unit of distance of the similar average speed route (hereinafter also referred to as the similar average speed power consumption rate) by referencing the source driving history information that is accumulated by the driving history accumulation unit 26.

The operation then proceeds to step S616, and the historical statistics processing unit 27 multiplies the similar average speed power consumption rate calculated in the step S615 described above by the total length of the planned route. Then, the historical statistics processing unit 27 sets the product as the power consumption for correction.

The operation then proceeds to step S617, and the historical statistics processing unit 27 corrects the power consumption that is calculated in step S409 or S410 described above, based on the power consumption for correction calculated in the above-described step S616. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar average vehicle speed power consumption rate and transmits (provides) the corrected power consumption to the source terminal device 2 when there is a similar average speed route within the source driving history information that is accumulated by the driving history accumulation unit 26.

On the other hand, when a determination is made that there is no similar average speed route in step S614, the operation proceeds to step S618; in step S618, the historical statistics processing unit 27 calculates the average value of the power consumption per unit of distance from all the routes of the source driving history information (hereinafter also referred to as the average power consumption rate) by referencing the source driving history information that is accumulated by the driving history accumulation unit 26.

The operation then proceeds to step S619, and the historical statistics processing unit 27 multiplies the average power consumption rate calculated in the step S618 described above by the total length of the planned route. Then, the historical statistics processing unit 27 sets the product as the power consumption for correction.

The operation then proceeds to step S620, and the historical statistics processing unit 27 corrects the power consumption that is calculated in steps S409 or S410 described above, based on the power consumption for correction calculated in the above-described step S619. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the average power consumption rate and transmits (provides) the corrected power consumption to the source terminal device 2 when all of the determinations of the steps S603, S606, S610, and S614 described above are "NO."

In this way, in the present embodiment, the historical statistics processing unit 27 calculates the power that is consumed when driving along the searched planned route, based on the first piece of driving history information of a specified driver, from among the first pieces of driving history information that are accumulated by the driving history accumulation unit 26. The historical statistics processing unit 27 then corrects the extracted power consumption, based on the calculated power consumption. Next, the historical statistics processing unit 27 provides information regarding the corrected power consumption. For this reason, acquiring the power consumption that takes into consideration the driving characteristics of the driver is possible. As a result, providing more appropriate power consumption information is possible.

As described above, in the present embodiment, an vehicle information providing device 3 acquires, sequentially from a vehicle-mounted device 1 that is installed on a vehicle A that has an electric motor 13 as a drive source, at least the driving location information, the power consumption information, or the charging location information and accumulates this as the driving history information (the first piece of driving history information, the second piece of driving history information). The vehicle information providing device 3 then refers to the accumulated first piece of driving history information and searches for a similar route that is either identical or similar to a planned route. A similar route is searched for again when the number of detected similar routes is less than the first predetermined value α1 or greater than the second predetermined value α2. Then, as a result of the search (searching), the detected similar route is determined to be the presentation route. The vehicle information providing device 3 then refers to the accumulated first piece of driving history information and second piece of driving history information and detects the power that is consumed when driving along the determined presentation route and the charging hubs that will be traversed when driving along the presentation route. Next, the vehicle information providing device 3 provides the information regarding the determined presentation route, as well as the determined power consumption and charging hubs. Accordingly, providing power consumption information and charging hub information that are more in accordance with the actual environment is possible.

In the present embodiment, an example was described in which the vehicle information providing device 3 determines (extracts) both the power that was consumed when a vehicle A actually drove a similar route, as well as the charging hubs, but another configuration may also be used. For example, the vehicle information providing device 3 may be configured to determine at least either the power consumption or the charging hubs. In this case, the vehicle information providing device 3 provides (transmits) only the power consumption or the charging hub that has been determined, along with the presentation route.

According to the present embodiment, the vehicle information providing device 3 acquires, sequentially from a vehicle-mounted device 1 installed in a vehicle A that has an electric motor 13 as a drive source, at least the driving location information, the power consumption information, or the charging location information and accumulates this as the driving history information (the first piece of driving history information, the second piece of driving history information). The vehicle information providing device 3 then refers to the accumulated first piece of driving history information and searches for a similar route that is either identical or similar to a planned route from the departure point $P_O$ to a destination point $P_D$. A similar route is searched for again when the number of detected similar routes is less than the first predetermined value α1 or greater than the second predetermined value α2. Then, as a result of the search (searching), the detected similar route is determined to be the presentation route. The vehicle information providing device 3 then refers to the accumulated first piece of driving history information and second piece of driving history information and detects the power that is consumed when driving along the set presentation route and the charging hubs that will be traversed when driving along the presentation route. Next, the vehicle information providing device 3 provides the information regarding the determined presentation route, as well as that for at least either the determined power consumption or the charging hubs. According to the present embodiment, the power that is consumed when a vehicle A travels and the charging hubs are determined with reference to the driving history information, that is, the information that is acquired while the vehicle A actually travels; as a result, providing information regarding the power consumption that is in accordance with the actual environment and information regarding the charging hubs is possible, according to the present invention.

Additionally, according to the present embodiment, when the number of detected similar routes is less than a first predetermined value α1 or greater than a second predetermined value α2, similar routes are searched for again, and the searched similar routes are determined to be presentation routes; as a result, determining an appropriate number of these as the presentation routes is possible. The amount of information that is provided can thereby be made to be within an appropriate range when providing the power consumption information and the charging hub information. In particular, according to the present embodiment, if the number of detected similar routes is less than the first predetermined value α1, a search is performed again by expanding the departure point range $R_O$ and the destination point range $R_D$ or by including transit routes, which are routes that at least pass through the departure point range $R_O$ and the destination point range $R_D$ within the search range; as a result, appropriately increasing the number of detected similar routes while maintaining a high degree of accuracy for the detected similar routes (the accuracy of the power consumption information) is possible. Additionally, according to the present embodiment, when the number of detected similar routes is greater than the second predetermined value α2, whether or not the traveling conditions (the air conditioner and outside temperature difference condition, the season condition, the travel time zone condition, the day of week condition, the driving altitude condition, the weather condition, the driving speed range condition, the regenerative skill condition) are similar is added as a condition for another search; therefore, extracting a presentation route that is more in line with the actual environment becomes possible when there are too many detected similar routes.

Embodiments of the present invention were described above, but these embodiments are described in order to facilitate an understanding of the present invention; they are not described in order to limit the present invention. Therefore, the elements disclosed in the embodiments above are intended to include all design modifications and equivalents thereto that lie within the technical range of the present invention.

Figure 15:
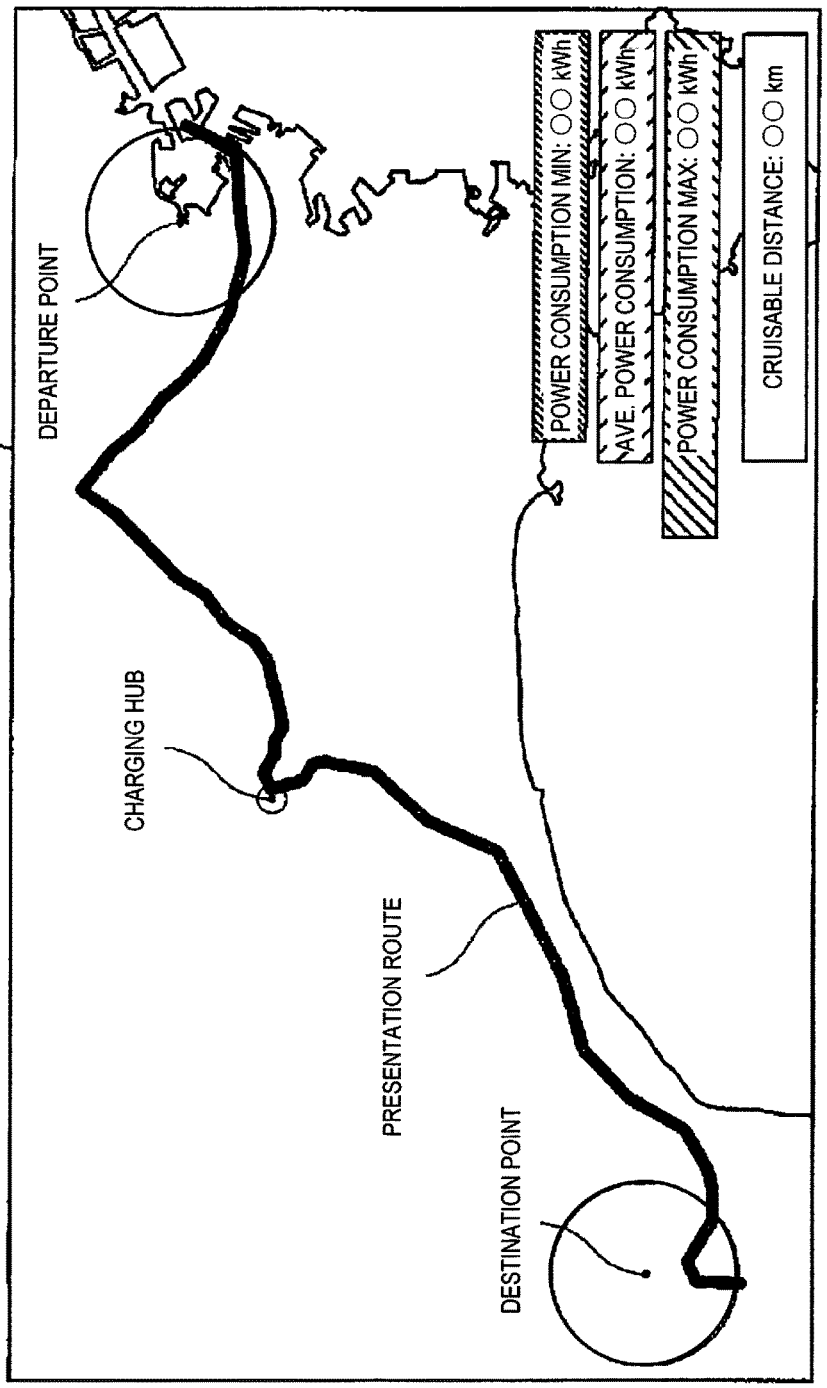
FIG. 15 is a view illustrating another example of the contents displayed by a display unit.

For example, in the above-described embodiment, the historical statistics processing unit 27 may be configured to refer to the first piece of driving history information that is accumulated by the driving history accumulation unit 26 and to determine the power consumption when driving along the presentation route (the similar route) for each driver. In this case, the historical statistics processing unit 27 transmits (provides) to the source terminal device 2 information regarding the maximum power consumption, the minimum power consumption, and the average power consumption, from the determined power consumption for each driver, along with information regarding the presentation route and the charging hubs. The source terminal device 2 thereby displays on the display screen the maximum power consumption (power consumption MAX), the minimum power consumption (power consumption MIN), and the average power consumption (average power consumption), in addition to the presentation route and the charging hubs, based on the received information, as illustrated in FIG. 15. The average power consumption can be that which is calculated in step S409 described above. In particular, according to this type of configuration, the power consumption when driving along the presentation route is calculated for each driver, and the maximum power consumption, the minimum power consumption, and the average power consumption of the calculated power consumption are provided. Accordingly, the user can obtain the degree of variation in the power consumption for each driver.

Figure 16:
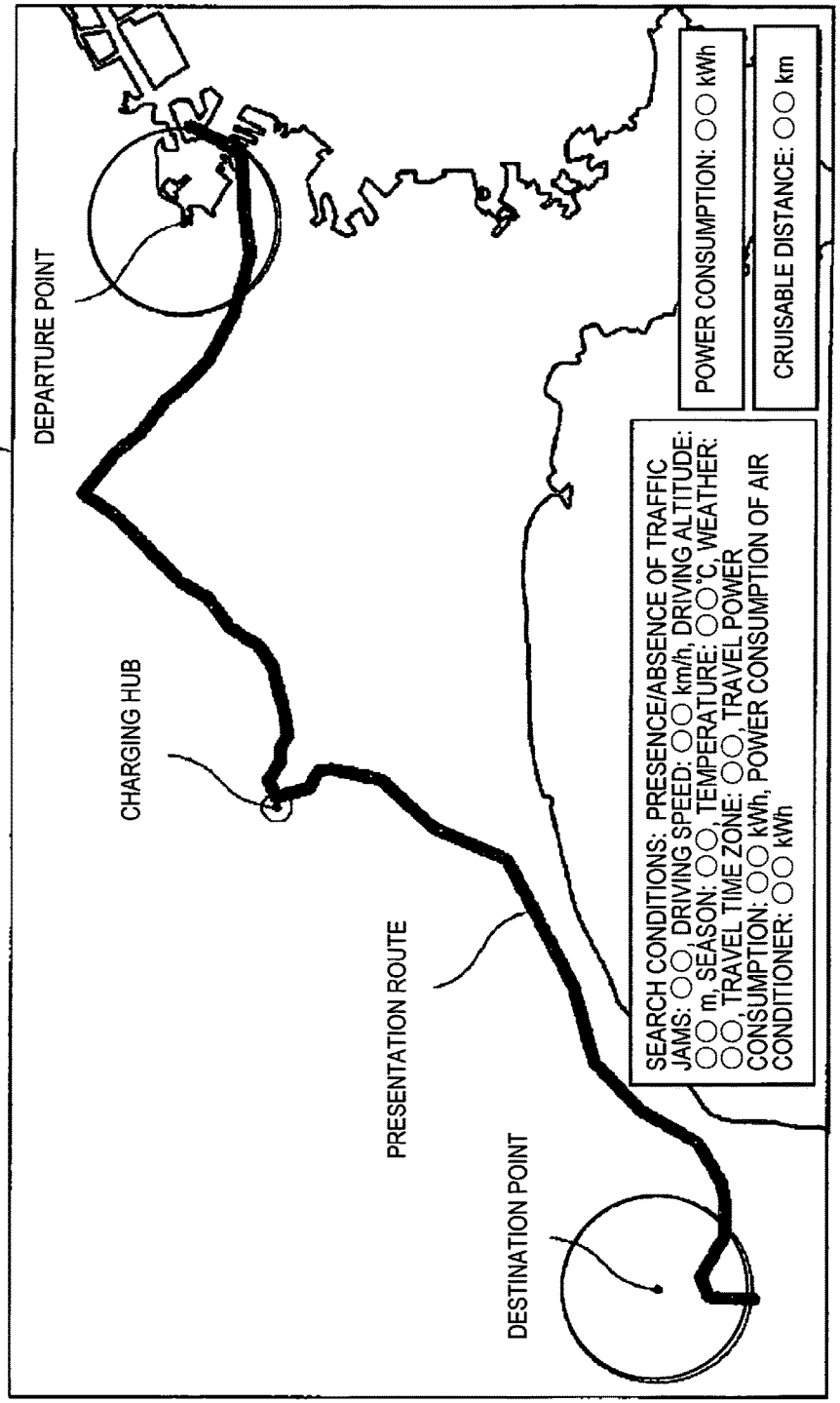
FIG. 16 is a view illustrating another example of the contents displayed by a display unit.

Additionally, in the embodiment described above, an example was explained in which the display unit 24 displays the power consumption and the charging hubs, along with the presentation route (the similar route), but another configuration may also be used. For example, the display unit 24 may be configured to display information regarding the presence/absence of traffic jams, the driving speed, the driving altitude, the season, the temperature, the weather, the travel time zone, the travel power consumption, and the power consumption by the air conditioner, which are included in the first piece of driving history information and the second piece of driving history information, used for the extraction of the power consumption and charging hubs. Specifically, the terminal device 2 receives an input of at least the presence/absence of traffic jams, the driving speed, the driving altitude, the season, the temperature, the weather, the travel time zone, the travel power consumption, or the power consumption by the air conditioner (hereinafter also referred to as the state quantity for search). Next, the terminal device 2 transmits the received information regarding the state quantity for search to the vehicle information providing device 3. Subsequently, when information that is transmitted by the terminal device 2 is received, the vehicle information providing device 3 (the historical statistics processing unit 27) acquires the search condition state quantity from the received information as the search condition. The historical statistics processing unit 27 then determines the power that has been consumed when driving along the selected presentation route, as well as the charging hubs that will be traversed when driving along the presentation route, by referencing the driving history information conforming to the acquired search condition, from among the driving history information that is accumulated by the driving history accumulation unit 26. Then, the historical statistics processing unit 27 transmits (provides) the acquired search condition information to the source terminal device 2, along with information regarding the presentation route (the similar route), the power consumption, and the charging hubs. The source terminal device 2 thereby displays on the display screen the search condition used for determining the power consumption and the charging hubs, in addition to the presentation route, the power consumption, and the charging hubs, based on the received information, as illustrated in FIG. 16. According to this kind of configuration, the search conditions used for determining the power consumption and the charging hubs are provided along with the presentation route, the power consumption, and the charging hubs. Accordingly, the user can obtain the search conditions used for determining the power consumption and the charging hubs.

Additionally, in the present embodiment, when the number of detected similar routes is greater than the second predetermined value $\alpha 2$, whether or not the traveling conditions (the air conditioner and outside temperature difference condition, the season condition, the travel time zone condition, the day of week condition, the driving altitude condition, the weather condition, the driving speed range condition, the regenerative skill condition) are similar was added as a condition for another search; however, the configuration can also be such that another search is performed after setting the departure point range $R_O$ and the destination point range $R_D$ to be smaller. In particular, by setting the departure point range $R_O$ and the destination point range $R_D$ to be smaller to perform another search, searching for a similar route having a travel start point and a travel end point that are closer to the departure point $P_O$ and the destination point $P_D$ is possible; as a result, providing power consumption information and charging hub information that are more in line with the actual environment is thereby possible.

Additionally, the embodiment described above was configured so that, if the number of detected similar routes is less than a first predetermined value $\alpha 1$, the departure point range $R_O$ and the destination point range $R_D$ are expanded, or a search is performed again after making a transit route, which is a route that at least passes through the departure point range $R_O$ and the destination point range $R_D$, as part of the search range; however, the present invention may also be configured so that a composite route described below is generated and the obtained composite route is detected as a similar route.

Figure 17:
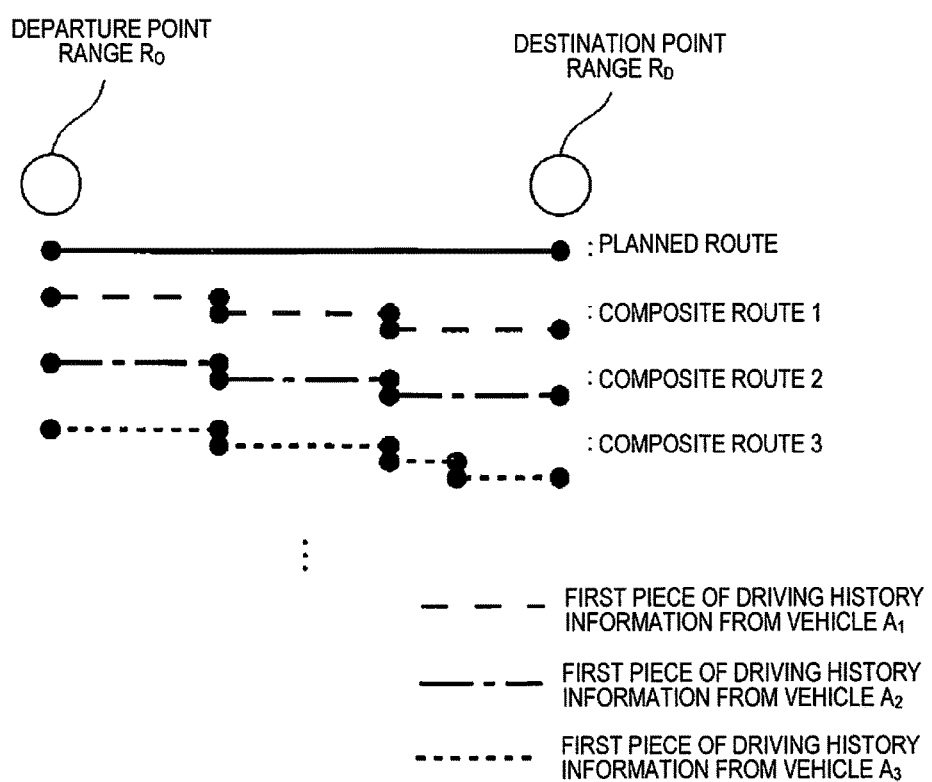
FIG. 17 is an explanatory view representing a composite route.

Here, FIG. 17 is an explanatory view representing a composite route. The historical statistics processing unit 27 generates a composite route by combining a plurality of routes that were traveled by the same vehicle by referencing the first piece of driving history information that is accumulated by the driving history accumulation unit 26, as illustrated in FIG. 17. For example, the historical statistics processing unit 27 first extracts the first piece of driving history information with identical vehicle IDs from the first piece of driving history information that is accumulated by the driving history accumulation unit 26. Next, the historical statistics processing unit 27 extracts from the extracted first piece of driving history information the routes that have a travel start point within the departure point range $R_O$, which is set in the above-described step S403, and that extend in the destination point range $R_D$ direction, which is set in the above-described step S403, along the planned route. Next, the historical statistics processing unit 27 assigns the travel end point of the route that was extracted in this way as the travel start point, repeatedly performs an operation to extract the route that extends in the destination point range $R_D$, and finally extracts a route having a travel end point within the destination point range $R_D$. The historical statistics processing unit 27 thereby generates a composite route by combining a plurality of extracted routes. The historical statistics processing unit 27 thereby detects the composite route that is generated in this way as a similar route. In this case, when extracting the power consumption in step S409 described above, the power that was consumed when driving along the routes that form the composite route shall be extracted and summated.

Figure 18:
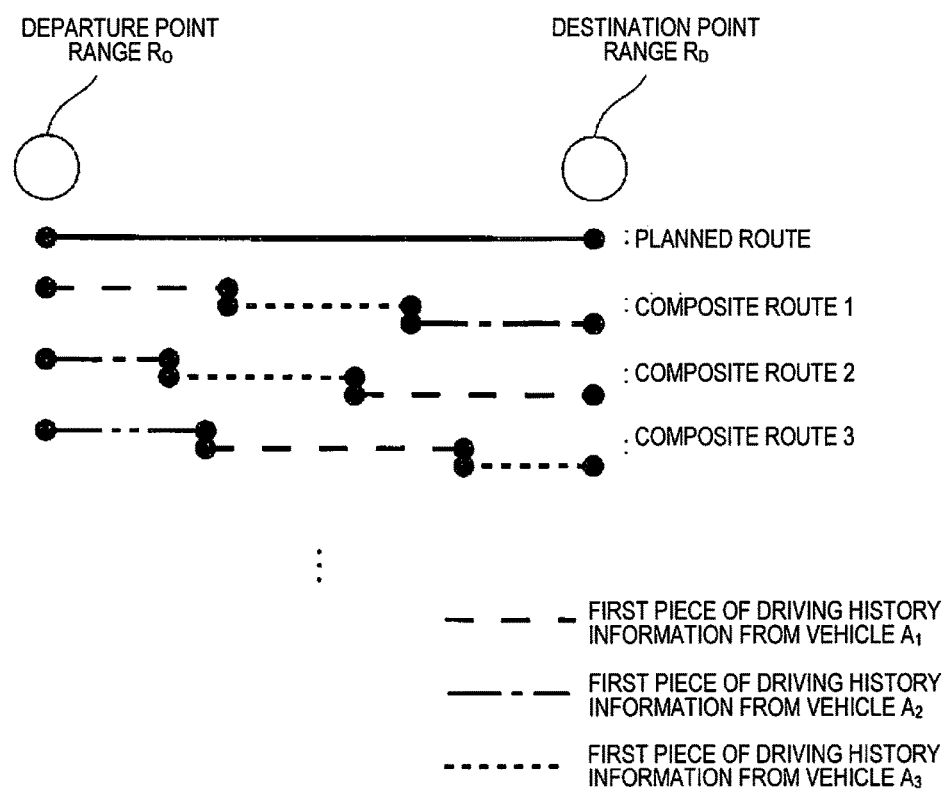
FIG. 18 is an explanatory view representing a modified example of a composite route.

Alternatively, as shown in FIG. 18, the configuration can be such that a composite route is formed by combining a plurality of routes that are traveled by a plurality of different vehicles by referencing the first piece of driving history information that is accumulated by the driving history accumulation unit 26. Here, FIG. 18 is an explanatory view representing another example of a composite route.

Additionally, when generating a composite point range in this way, the composite route may be generated by expanding the departure point range $R_O$ and the destination point range $R_D$ and by using the expanded departure point range $R_O'$ and destination point range $R_D'$; or, the composite route may be generated using a transit route, which is a route that at least passes through the departure point range $R_O$ and the destination point range $R_D$. By configuring the present invention so that, when the number of detected similar routes is less than the first predetermined value $\alpha 1$, a composite route is generated and the obtained composite route is detected as a similar route, appropriately increasing the number of detected similar routes while maintaining a high degree of accuracy for the detected similar routes (the accuracy of the power consumption information) becomes possible.

In the embodiment described above, employing a configuration in which the size of the departure point range $R_O$ and the destination point range $R_D$ are changed according to the distance between the departure point $P_O$ and the destination point $P_D$ (are increased as the distance increases) or in which the size of the departure point range $R_O$ and the destination point range $R_D$ are changed according to the time required to travel from the departure point $P_O$ to the destination point $P_D$ (the travel time) (are increased as the required time increase) is also possible.

In the above-described embodiment, the driving history accumulation unit 26 of the vehicle information providing device 3 corresponds to the history information accumulation unit of the present invention, and the historical statistics processing unit 27 of the vehicle information providing device 3 corresponds to the input unit, the range setting unit, the similar route setting unit, the searching unit, the presentation route determination unit, the presentation information determination unit, and the presentation information provision unit of the present invention.

The invention claimed is:

1. A vehicle information providing device configured to communicate with a terminal device and with a plurality of vehicle-mounted devices installed on a plurality of vehicles that each have an electric motor as a drive source,
the terminal device comprising:
an input unit configured to receive, from a user, a departure point to a destination point for searching for a route; and
a display, and
the vehicle information providing device comprising:
a history information accumulation unit that sequentially acquires driving location information and power consumption information from the plurality of vehicle-mounted devices and accumulates the sequentially acquired information as driving history information; and
a historical statistics processor programmed to, for each of the plurality of vehicles:
acquire the departure point and the destination point from the terminal device;
set a predetermined range including the departure point as a departure point range and set a predetermined range including the destination point as a destination point range;
extract from the driving history information that is accumulated by the history information accumulation unit, perform a first search for a route that was driven from the departure point range to the destination point range, using at least one search condition, from among the routes that the vehicle has driven, and set each of the routes resulting from the first search as a similar route;
perform a second search by changing the at least one search condition when a number of similar routes detected by the first search is less than a first predetermined value or greater than a second predetermined value and setting the routes resulting from the second search as additional similar routes, the second predetermined value being greater than the first predetermined value;
determine a similar route from among the similar routes resulting from the first search and the second search as a presentation route;
determine at least one selected from the group consisting of power that is consumed when driving along the presentation route and charging hubs that will be traversed when driving along the presentation route by referencing the driving history information that is accumulated in the history information accumulation unit; and
transmit information regarding the determined presentation route and the at least one selected from the group consisting of power that is consumed when driving along the presentation route and charging hubs that will be traversed when driving along the presentation route to the terminal device.

2. The vehicle information providing device as recited in claim 1, wherein
when the number of similar routes resulting from the first search is greater than the second predetermined value, the second search is performed by adding the following conditions as search conditions:
a route that has been traveled from the departure point range to the destination point range; and
a travel condition when the vehicle travels the route that is similar to the travel condition that is expected by the user.

3. The vehicle information providing device as recited in claim 2, wherein
the travel condition includes at least one of the following conditions:
a travel time zone, a driving altitude, a day of a week, a season, an outside temperature, a weather condition, a set temperature of an air conditioner, a driving speed range, and a condition regarding driving skills of the driver.

4. The vehicle information providing device as recited in claim 1, wherein
when the number of similar routes resulting from the first search is greater than the second predetermined value, the second search is performed by decreasing at least one selected from the group consisting of the departure point range and the destination point range.

5. The vehicle information providing device as recited in claim 1, wherein
when the number of similar routes resulting from the first search is less than the first predetermined value, the second search is performed by expanding at least one selected from the group consisting of the departure point range and the destination point range.

6. The vehicle information providing device as recited in claim 5, further wherein
when expanding at least one selected from the group consisting of the departure point range and the destination point range, which are set by the range setting unit, the historical statistics processor is programmed to expand at least one selected from the group consisting of the departure point range and the destination point range in a state maintaining a minimum distance that connects the departure point range and the destination point range.

7. The vehicle information providing device as recited in claim 1, wherein
when the number of similar routes resulting from the first search is less than the first predetermined value, the second search is performed by adding routes that pass through the departure point range and the destination point range as search targets.

8. The vehicle information providing device as recited in claim 1, wherein
when the number of similar routes resulting from the first search is less than the first predetermined value, the historical statistics processor is programmed to generate a composite route by combining a plurality of routes on which at least one of the a plurality of vehicles has traveled and add the generated composite route as a search target by referencing the driving history information that is accumulated by the history information accumulation unit.

9. The vehicle information providing device as recited in claim 1, wherein the route is a path from an origin to a destination.

* * * * *